United States Patent
Morikawa et al.

(10) Patent No.: US 9,221,099 B2
(45) Date of Patent: Dec. 29, 2015

(54) REFRACTORY MATERIAL AND CASTING NOZZLE

(71) Applicants: Katsumi Morikawa, Fukuoka (JP); Akinari Sasaki, Fukuoka (JP); Naomi Yoshitsugu, Fukuoka (JP); Ling Li, Fukuoka (JP)

(72) Inventors: Katsumi Morikawa, Fukuoka (JP); Akinari Sasaki, Fukuoka (JP); Naomi Yoshitsugu, Fukuoka (JP); Ling Li, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 194 days.

(21) Appl. No.: 13/689,879

(22) Filed: Nov. 30, 2012

(65) Prior Publication Data

US 2013/0334263 A1    Dec. 19, 2013

(30) Foreign Application Priority Data

Dec. 1, 2011   (JP) ................................ 2011-263870

(51) Int. Cl.
*C04B 35/04* (2006.01)
*C04B 35/06* (2006.01)
*B22D 41/50* (2006.01)
(Continued)

(52) U.S. Cl.
CPC .............. *B22D 41/50* (2013.01); *B22D 11/10* (2013.01); *B22D 11/11* (2013.01); *B22D 41/505* (2013.01); *B22D 41/54* (2013.01); *B22D 41/58* (2013.01); *C04B 35/06* (2013.01); *Y10T 428/24997* (2015.04); *Y10T 428/249969* (2015.04); *Y10T 428/265* (2015.01)

(58) Field of Classification Search
CPC .................................. C04B 35/06; B22D 41/54
See application file for complete search history.

(56) References Cited

U.S. PATENT DOCUMENTS 5,124,288 A * 6/1992 Ishikawa et al. .............. 501/121
7,275,584 B2 * 10/2007 Morikawa et al. ............ 164/488
(Continued)

FOREIGN PATENT DOCUMENTS

JP    54131612    10/1979
JP    57056377    4/1982
(Continued)

OTHER PUBLICATIONS

Cutler, Increasing Hydration Resistance of Calcia, American Ceramic Society Bulletin, vol. 49, No. 5 (1970), p. 531-533.

*Primary Examiner* — Karl Group
(74) *Attorney, Agent, or Firm* — Fleit Gibbons Gutman Bongini & Bianco PL; Martin Fleit; Paul D. Bianco

(57) ABSTRACT

A refractory product includes CaO component-containing refractory particles and MgO component-containing refractory particles. The refractory material contains, a chemical composition measured after it has undergone heating in a non-oxidizing atmosphere at 1000° C., one or more of the following metal oxides $B_2O_3$, $TiO_2$, $V_2O_5$, $P_2O_5$ and $SiO_2$ in a total amount of 0.1 to 5.0 mass %, and free carbon in an amount of 2 to 35 mass %, with the remainder including CaO and MgO whose mass ratio (CaO/MgO) is in the range of 0.1 to 1.5. In microscopic observation performed at room temperature on the refractory material which has undergone the above heating, an inorganic film comprised of CaO and the one or more metal oxides is formed in at least each CaO surface of the refractory particles each containing either one or both of a CaO component and an MgO component, with a thickness of 0.1 to 25 μm.

11 Claims, 10 Drawing Sheets

(51) Int. Cl.
   *B22D 11/10* (2006.01)
   *B22D 41/54* (2006.01)
   *B22D 11/11* (2006.01)
   *B22D 41/58* (2006.01)

(56) References Cited

U.S. PATENT DOCUMENTS

| | | | |
|---|---|---|---|
| 7,591,976 B2* | 9/2009 | Ogata et al. | 266/286 |
| 7,891,408 B2* | 2/2011 | Ogata et al. | 164/488 |
| 8,172,114 B2* | 5/2012 | Morikawa et al. | 222/606 |
| 2005/0274486 A1* | 12/2005 | Ogata et al. | 164/459 |
| 2008/0032882 A1* | 2/2008 | Ogata et al. | 501/109 |
| 2010/0084441 A1* | 4/2010 | Morikawa et al. | 222/591 |

FOREIGN PATENT DOCUMENTS

| | | | |
|---|---|---|---|
| JP | 2003040672 A | | 2/2003 |
| JP | 2005270985 | * | 10/2005 |
| JP | 2008188464 A | | 8/2008 |
| JP | 2009090319 A | | 4/2009 |
| JP | 2010036229 A | | 2/2010 |
| JP | 2010167481 A | | 8/2010 |

* cited by examiner

A

B

A

B

REFRACTORY MATERIAL AND CASTING NOZZLE

TECHNICAL FIELD

The present invention relates to a refractory product primarily for continuous casting of molten steel, particularly for continuous casting of aluminum killed steel, and a casting nozzle, such as a long nozzle, an immersion nozzle, or an upper or lower nozzle of a sliding nozzle device, using the refractory product.

BACKGROUND ART

Alumina-based inclusions in molten steel are apt to be deposited (built up) on a refractory surface through physical contact with and/or chemical action on the molten steel. In this case, the deposit will grow and become large inclusions, and the large inclusions will be incorporated into slabs together with molten steel, causing slab defects and deterioration of slab quality. Moreover, if alumina-based inclusions in molten steel are deposited, for example, on an inner bore portion of a casting nozzle such as an immersion nozzle or an outlet portion of the casting nozzle having a great influence on a molten steel flow in a casting mold, thereby causing a change in initial shape of such a portion, it becomes unable to maintain a uniform flow of molten steel in the casting mold, and, due to the so-called "biased flow", mold powder, gas bubbles and others are entrained into slabs, causing deterioration in slab quality. Thus, in casting, for example, of aluminum killed steel for thin sheets in which steel quality recently has become increasingly important as high grade steel, great efforts have been made to prevent adhesion of alumina-based non-metallic inclusions (hereinafter referred to simply as "alumina adhesion") onto a refractory article such as a casting nozzle.

As a material for an alumina adhesion-resistant refractory product for use in a casting nozzle, there have been known a $ZrO_2$—CaO—C based material, an $SiO_2$—C based material, and a so-called "carbonless material" with minimal carbon. As the carbonless material, $Al_2O_3$ based, $Al_2O_3$—$SiO_2$ based, $SiO_2$ based and spinel based material have been commonly used, and a material with an enhanced ability of producing a compound having a melting point equal to or less than a molten steel temperature, such as a CaO—$SiO_2$—$ZrO_2$ based material, is also used recently. However, the commonly-used carbonless material has a problem that it can produce only a small amount of slag phase on a working surface of a casting nozzle through a contact reaction with alumina-based inclusions in aluminum killed steel, and, even if produced, a ratio of a liquid-phase to the entire slag phase (liquid-phase rate) at the level of a molten steel temperature is gradually lowered along with an increase in $Al_2O_3$ concentration in the slag phase due to continuous contact with molten steel, causing deterioration in alumina adhesion-resistant property, so that it will be sensitively influenced by steel grades and casting conditions such as casting speed, thereby leading to difficulty in obtaining stable alumina adhesion-resistant capability.

As an example of a technique of enhancing an ability of producing a compound having a melting point equal to or less than a molten steel temperature, the following Patent Document 1 discloses a refractory product of a carbonless material comprising CaO: 5 to 40 mass %, $SiO_2$: 2 to 30 mass %, $ZrO_2$: 35 to 80 mass %, and carbon: less than 5 mass % (including zero). However, according to the composition disclosed in the Patent Document 1, a slag phase containing $ZrO_2$, as a low-melting-point compound, is produced at a working interface between the refractory product and molten steel by a contact reaction with alumina as inclusions in the molten steel, so that the $ZrO_2$-containing slag phase becomes highly viscous, and alumina is more likely to adhere to the slag phase without flowing down, depending on a molten steel flow rate. Thus, there is a problem of failing to ensure stable alumina adhesion-resistant capability, by the influence of steel grades and casting conditions. Moreover, the carbonless material containing a large amount of CaO while reducing carbon to less than 5 mass % has another problem that a thermal expansion thereof is more likely to become greater than 1% at 1500° C. due to its strong ion-binding property, and strength becomes lower due to the low carbon content. Therefore, it is difficult to form a casting nozzle by using only the carbonless material. Thus, in many cases, the carbonless material is arranged in a region to be subjected to a contact with molten steel, and a $Al_2O_3$—C(AG) or $ZrO_2$—C(ZG) based material having a thermal expansion of less than 1% at 1500° C. is used as a nozzle body material and integrated with the carbonless material, as described in the embodiments of the Patent Document 1. In this case, a problem still remains in terms of stability against cracking in a structural body during exposure to heat, due to a difference in thermal expansion between the two materials.

In regard to the aforementioned problem that stable alumina adhesion-resistant capability cannot be obtained due to variations in casting conditions and steel grades, it is tried to use a refractory product containing dolomite clinker (see, for example, the following Patent Document 2). In the dolomite clinker-containing refractory product, a CaO component in the refractory product and alumina-based inclusions in molten steel easily produce a liquid phase of a CaO—$Al_2O_3$—MgO based compound having excellent desulfurization ability, at an interface with respect to molten steel, to exert excellent anti-alumina adhesion effect. However, a material using dolomite clinker has a primary problem of poor handleability due to susceptibility to hydration (slaking problem).

Generally, dolomite clinker is a particular raw material in which a highly-active CaO component exists in a continuous matrix, and fine MgO crystal grains are dispersed in the matrix. Thus, while dolomite clinker has superb reactivity with alumina in molten steel and high alumina adhesion-resistant capability, it easily produces calcium hydroxide (Ca(OH)$_2$) when CaO in the matrix contacts moisture in the air or contacts water directly (so-called "slaking"). If CaO-containing particles are hydrated, volume expansion due to Ca(OH)$_2$ produced through hydration causes not only internal destruction of the particles but also destruction of the entire microstructure of the refractory product, thereby leading to difficulty in maintaining a shape as a structural body, in many cases. Therefore, various anti-slaking measures have heretofore been proposed.

Specifically, as means to prevent slaking of a CaO-based particle, there have been typically proposed (1) a technique of adding various additives into a CaO-based particle to coat CaO therewith, (2) a technique of carbonating a surface of a CaO particle, (3) a technique of coating a surface of a CaO particle with water-free oil, and (4) a technique of forming a hydration suppressive component layer between CaO-based particles.

The technique (1) includes a technique of incorporating one or more selected from the group consisting of $Fe_2O_3$, $Cr_2O_3$ and $TiO_2$, into a CaO or CaO—MgO particle, in a total amount of 10 mass % or less, as described in the Patent Document 3. However, the technique based on the addition of an oxide other than CaO and MgO can improve slaking resistance but to an insufficient extent, and a low-melting-point substance such as $2CaO \cdot Fe_2O_3$ (melting point: 1447° C.) or $2CaO \cdot Al_2O_3$ (melting point: 1360° C.) is produced, which causes a problem of impairing refractoriness.

The following Patent Document 4 also proposes a refractory product for continuous casting, which contains: 1 to 97 weight % of $CaO/TiO_2$ (mole ratio: 0.27 to 1.5) based clinker and/or $CaO$—$TiO_2$—$ZrO_2$ (predetermined mole ratio) based clinker; 3 to 40 weight % of a carbon raw material; and 96 weight % or less of other refractory raw material. However, slaking resistance is improved but to an insufficient extent. If the refractory product is prepared such that the above components are contained in particles in respective amounts enough to obtain sufficient slaking resistance, a low-melting-point substance is produced, which causes a problem of impairing refractoriness. Particularly, in the case where the clinker contains $ZrO_2$, a problem of deterioration in an alumina adhesion-resistant effect will arise. Moreover, when the CaO-containing clinker is used in combination with $Al_2O_3$-based aggregate, a low-melting-point substance is produced at 1360° C. or more, so that refractoriness as a casting nozzle to be used at a temperature of 1500° C. or more will be deteriorated. In a casting nozzle generally formed using a plurality of materials, there is a problem of deterioration in flexibility of material arrangement, as with the former case where the one or more components easily reacting with CaO to produce a low-melting-point substance are dispersed in the entire clinker. Further, in the case of using the CaO-containing clinker, the refractory product exhibits a high expansion characteristic due to its strong ion-binding property. Thus, in a usage environment of a continuous casting nozzle to be subjected to rapid heating and rapid cooling, a problem still remains in terms of thermal shock resistance.

As to the technique (2), the following Non-Patent Document 1 reports that slaking resistance is improved by subjecting a CaO sintered body to a heating treatment under a $CO_2$ atmosphere to form a $CaCO_3$ film in a surface of the CaO sintered body, which is known as an anti-slaking technique for calcia clinker (lime clinker). However, in the technique (2) and the surface coating technique using oil (3) alike, during a kneading process in which CaO-containing particles each coated with a thin and soft film are mixed with refractory particles having the same level of hardness as a polishing material, the surface coating layer is easily peeled by mutual collision and shearing force of the particles, which causes a problem of loss of slaking resistance. Even if a thick film layer is formed to solve this problem, for example, by a carbonation treatment, a film defect occurs due to a difference in thermal expansion between the $CaCO_3$ film and an interface of CaO in each particle, which causes a problem of deterioration in slaking resistance, despite the intention.

As to the technique (4), the following Patent Document 5 proposes techniques for a continuous casting nozzle prepared by subjecting a mixture comprising 40 to 90 wt % of lime, 10 to 60 wt % of carbon, and 0.1 to 10 wt % of one or more selected from the group consisting of boron carbide, boron nitride and boron, to kneading, shaping and burning. In the Patent Document 5, there is the following description: "although metals other than boron are also effective in preventing slaking of a lime-containing refractory product, boron carbide, boron nitride and boron exhibit extremely significant effects as compared with them.", and it is assumed that the reason is because "boron or boron compound is transformed into $B_2O_3$ through compounding or decomposition during burning for a nozzle, and lime is coated with the $B_2O_3$", and "the added boron carbide or boron nitride, or boron carbide transformed from the added boron through compounding with carbon, have properties similar to those of carbon, and thereby they are substituted for carbon and incorporated into lime as a solid solution to coat the lime".

However, under a reducing atmosphere, boron carbide, boron nitride or boron has low reactivity as compared to oxides, so that it is not sufficiently effective in forming a film for coating a surface of a particle, such as a CaO surface, and hard to coat the surface of the particle, such as a CaO surface, without any defect. Thus, although some effect on hydration of CaO can be obtained by the technique disclosed in the Patent Document 5, the effect is significantly small. As above, this technique cannot provide a casting nozzle with handleability equivalent to that of a product formed using a non-hydratable component such as a conventional alumina-based component, so that it is still impossible to solve the technical problem of preventing hydration of CaO.

A second problem in the material using dolomite clinker is that it exhibits a high expansion characteristic. Such a high expansion characteristic is exhibited because a basic oxide such as CaO or MgO fundamentally has a strong ion-binding property. Excellent alumina adhesion-resistance can be ensured by arranging such a dolomite clinker-containing material to define an inner bore surface of a casting nozzle. On the other hand, when the high-expansion, dolomite clinker-containing material is used as an inner bore material and combined with a low-expansion nozzle body material, a resulting nozzle will always face a risk that breaking occurs due to a thermal expansion difference between the two materials. As measures against the risk, a technique for allowing such a type of nozzle to be stably used as a casting nozzle is disclosed, for example, in the following Patent Documents 6 and 7. However, the technique involves a production problem caused by complexity in production process and nozzle structure.

LIST OF PRIOR ART DOCUMENTS

Patent Documents

Patent Document 1: JP 2003-040672A
Patent Document 2: JP 2010-167481A
Patent Document 3: JP 54-131612A
Patent Document 4: JP 08-188464A
Patent Document 5: JP 57-056377A
Patent Document 6: JP 2009-090319A
Patent Document 7: JP 2010-036229A Non-Patent Documents Non-Patent Document 1: Amer. Cerami. Soc. Bull, 49(5), 531 (1970)

SUMMARY OF THE INVENTION

Technical Problem

It is a primary technical problem of the present invention to prevent a refractory product comprising a CaO component from hydration (slaking) of CaO, in a production stage, during storage and in a casting stage, over long periods.

Solution to the Technical Problem

In order to solve the above technical problem, the present invention is designed to improve slaking resistance in a refractory product comprising a CaO component, by a new anti-hydration reaction technique based on particle protection. The present invention is also designed to significantly lower a thermal expansion of the refractory product by forming a certain void layer around a refractory particle containing CaO and/or MgO exhibiting a high expansion characteristic, particularly, CaO. Further, the present invention makes it possible to provide a previously unachievable casting nozzle which is less likely to cause a hydration reaction and a risk of breaking due to thermal shock or thermal expansion difference during preheating or casting, and is capable of being easily produced. In other words, the present invention makes it possible to provide a casting nozzle capable of highly reducing adhesion of molten steel-derived alumina-based inclusions onto a surface thereof, such as an inner bore surface, during casting, while ensuring easiness and handleability equivalent to those in a casting nozzle formed using a non-hydratable component, in all stages of production, storage and actual use.

Specifically, the present invention provides a refractory product described in the following sections (1) to (4), and a casting nozzle described in the following sections (5) to (9).

(1) A refractory product comprising CaO component-containing refractory particles and MgO component-containing refractory particles, the refractory product containing, in terms of a chemical composition measured after it has undergone heating in a non-oxidizing atmosphere at 1000° C., one or more metal oxides selected from the group consisting of $B_2O_3$, $TiO_2$, $V_2O_5$, $P_2O_5$ and $SiO_2$ in a total amount of 0.1 to 5.0 mass %, and free carbon in an amount of 2 to 35 mass %, with the remainder including CaO and MgO whose mass ratio (CaO/MgO) is in the range of 0.1 to 1.5, wherein, in microscopic observation performed at room temperature on a sample of the refractory product which has undergone heating in a non-oxidizing atmosphere at 1000° C., an inorganic film comprised of CaO and the one or more metal oxides selected from the group consisting of $B_2O_3$, $TiO_2$, $V_2O_5$, $P_2O_5$ and $SiO_2$ is formed in at least each CaO surface of the CaO component-containing refractory particles, with a thickness of 0.1 to 25 µm. (Claim 1)

(2) The refractory product described in the section (1), which contains calcium carbonate ($CaCO_3$) in an amount of 0.1 to less than 2.5 mass %, in a state in which the refractory product has not undergone a heat treatment at a temperature equal to or greater than a decomposition temperature of $CaCO_3$. (Claim 2)

(3) The refractory product described in the section (1) or (2), wherein, in a microscopic observation field of view during the microscopic observation performed at room temperature on a sample of the refractory product which has undergone heating in a non-oxidizing atmosphere at 1000° C., a total thickness of void spaces located on opposite sides of a maximum-size one of a plurality of refractory particles each containing either one or both of a CaO component and an MgO component and in an interface between the maximum-size refractory particle and a carbonaceous matrix is in a range of 0.1 to 3.0% of a particle size of the maximum-size refractory particle. (Claim 3)

(4) The refractory product described in any one of the sections (1) to (3), which further contains one or more selected from the group consisting of SiC, $Si_3N_4$, $ZrO_2$ and metal Si, wherein, on an assumption that respective contents of SiC, $Si_3N_4$, $ZrO_2$ and metal Si are determined in terms of a chemical composition as measured after the refractory product has undergone heating in a non-oxidizing atmosphere at 1000° C.: in the case of selecting SiC and/or $Si_3N_4$, either one or both of them are contained in an amount of 20 mass % or less, individually or in total; in the case of selecting $ZrO_2$, it is contained in an amount of 5 mass % or less; and in the case of selecting metal Si, it is contained in an amount of 2 mass % or less. (Claim 4)

(5) A casting nozzle comprising the refractory product described in any one of the sections (1) to (4), wherein the refractory product is arranged in a part or an entirety of a region to be subjected to a contact with molten steel, in the form of a single layer with a thickness ranging from a contact surface with molten steel to a back surface opposed thereto. (Claim 5)

(6) A casting nozzle formed in a multi-layer structure comprising: a first refractory layer arranged to define a part or an entirety of a surface to be subjected to a contact with molten steel, wherein the first refractory layer is composed of the refractory product described in any one of the sections (1) to (4); and a second refractory layer arranged on the side of a back surface of the first refractory layer, wherein the second refractory layer has a composition different from that of the first refractory layer, and wherein the first and second refractory layers are integrated together in direct contact relation to each other. (Claim 6)

(7) A casting nozzle formed in a multi-layer structure comprising: a first refractory layer arranged to define a part or an entirety of a surface to be subjected to a contact with molten steel, wherein the first refractory layer is composed of the refractory product described in any one of the sections (1) to (4); a second refractory layer arranged on the side of a back surface of the first refractory layer, wherein the second refractory layer has a composition different from that of the first refractory layer; and a sheet-shaped third layer arranged between the first refractory layer and the second refractory layer, wherein the third layer contains carbon in an amount of 90 mass % or more and has a thickness of 0.1 to 3 mm, and wherein the first refractory layer and the second refractory layer are formed in an integral structure in non-contact relation to each other. (Claim 7)

(8) A casting nozzle formed in a multi-layer structure comprising: a first refractory layer arranged to define a part or an entirety of a surface to be subjected to a contact with molten steel, wherein the first refractory layer is composed of the refractory product described in any one of the sections (1) to (4); and a second refractory layer arranged on the side of a back surface of the first refractory layer, wherein the second refractory layer has a composition different from that of the first refractory layer, and wherein the first refractory layer and the second refractory layer are bonded together by mortar having a composition free of flow-down due to melting at a molten steel temperature, whereby the first refractory layer and the second refractory layer are retained in non-contact relation to each other. (Claim 8)

(9) The casting nozzle described in any one of the sections (5) to (8), which comprises a layer composed of a gas-injecting refractory member and provided in a part of an inner bore portion. (Claim 9)

Details of the present invention will be described below.

First of all, a chemical composition of the refractory product of the present invention will be described.

The present invention is directed to a refractory product comprising CaO component-containing refractory particles and MgO component-containing refractory particles. The refractory product is characterized in that it contains, in terms of a chemical composition measured after it has undergone heating in a non-oxidizing atmosphere at 1000° C., CaO and MgO in a total amount of 60 to 97.9 mass % and at a mass ratio (CaO/MgO) of 0.1 to 1.5, one or more metal oxides selected from the group consisting of $B_2O_3$, $TiO_2$, $V_2O_5$, $P_2O_5$ and $SiO_2$ in a total amount of 0.1 to 5.0 mass %, and free carbon in an amount of 2 to 35 mass %.

In the present invention, the purpose of specifying the chemical composition "after the refractory product has undergone heating in a non-oxidizing atmosphere at 1000° C." is to promote removal of water and volatile matter from organic substances, hydrates and carbonate compounds in the refractory product, and carbonization of an organic binder component, thereby obtaining a stationary state in terms of composition. Although the temperature may be 800° C. or more if it is just needed to satisfy this requirement, it is set to 1000° C. to facilitate enhancing analytical accuracy based on stabilization of a chemical composition in the refractory product, i.e., to settle spreading of volatile matter in the refractory components, particularly, in a resin component, and prevent formation of a new substance due to a chemical reaction at a temperature of greater than 1000° C. From this point of view, a heating time is set to a period to be continued until a change in weight due to the heating disappear (this also applies to the following description). As a specific example of the technique for heating in a non-oxidizing atmosphere at 1000° C., it is possible to employ a technique of subjecting the refractory product to burning in a sheath filled with a carbonaceous raw material such as coke, or a technique of holding the refractory product at 1000° C. for 1 to 3 hours, in an inert gas atmosphere such as nitrogen or argon, where an oxygen concentration is adjusted to 0.1% or less. Specific conditions, such as an atmosphere, a holding time and a size of a sample, may be arbitrarily selected and determined according to the above purpose.

As used in the present invention, the term "free carbon" means particle-form (including a meaning of "fiber-form") carbon, such as a carbonaceous component produced by subjecting various organic binders, pitch, tar and/or carbon black, except carbides such as $B_4C$ and $SiC$, to heating in a non-oxidizing atmosphere at 1000° C., and crystalline carbon, e.g., graphite. The "free carbon" will hereinafter be referred to simply as "carbon".

In the present invention, an optimal chemical composition (composition) of the refractory product was specified based on findings from an evaluation method (in-molten steel rotation test) designed to reproduce a phenomenon of alumina adhesion onto a refractory product under an aftermentioned molten steel flow rate. In the refractory product, CaO is a component for contributing to a reaction with alumina in molten steel to produce a slag composite, and MgO is a component for adjusting refractoriness of the slag composite to provide erosion/corrosion resistance. As a result of studies based on the evaluation method, it was proven that the mass ratio (CaO/MgO) and the carbon content exert a great influence on alumina adhesion-resistance and erosion/corrosion resistance (wear resistance) of the refractory product. Specifically, as to the mass ratio (CaO/MgO), when the mass ratio is set in the range of 0.1 to 1.5, alumina adhesion-resistance and wear resistance are set to fall within a desired range for bringing a balance therebetween. If the mass ratio (CaO/MgO) is less than 0.1, an absolute amount of CaO required for producing a $CaO-Al_2O_3$ based slag composite in a refractory product-molten steel interface becomes insufficient, so that alumina adhesion tends to be accelerated, although a wear amount is small. On the other hand, if the mass ratio (CaO/MgO) is greater than 1.5, a $CaO-Al_2O_3$ based melt is excessively produced, so that the wear amount tends to be increased, and consequently in-steel inclusions are increased, causing a slab quality problem.

Further, when the carbon content, and the total content of the one or more metal oxides selected from the group consisting of $B_2O_3$, $TiO_2$, $V_2O_5$, $P_2O_5$ and $SiO_2$ are set, respectively, in the range of 2 to 35 mass % and in the range of 0.1 to 5.0 mass %, and the remainder is a composition of CaO and MgO, specifically, the total content of the CaO and the MgO is set in the range of 60 to 97.9 mass %, alumina adhesion-resistance and mechanical and thermal quality can be set to fall within a desired range. One function of carbon is to form a carbonaceous bond connecting between particles. As a carbon source which forms this bond (the "bond-forming carbon source" will hereinafter be also referred to as "binder carbon"), it is possible to use a so-called "carbon-based binder" which is capable of leaving residual carbon after burning in a non-oxidizing atmosphere under the condition that it is dispersed in a refractory composition in the form of a liquid. In order to ensure mechanical strength, processability (workability, machinability, etc.) and thermal shock resistance, it is possible to use a particle-form (including a meaning of "fiber-form") carbonaceous raw material together with the binder carbon. The mixture may be used such that a mass ratio of the binder carbon to the carbonaceous raw material other than the binder carbon falls within the range of 10/90 to 90/10. This makes it possible to suppress shrinkage as the refractory product and obtain material properties excellent in mechanical strength and thermal shock resistance.

Another function of carbon is to create a CO atmosphere in a microstructure of a refractory product, i.e., carbon acts to allow an oxide component having a relatively high vapor pressure to easily migrate through the microstructure, as mentioned later. The reason why the carbon content is set in the range of 2 to 35 mass % is as follows. If the carbon content in the refractory product is less than 2 mass %, a bond component for binding between particles becomes insufficient in amount, so that strength is lowered, causing deterioration in quality of the refractory product and thus restrictions on applicable region thereof. On the other hand, if the carbon content is greater than 35 mass %, it is advantageous in terms of thermal shock resistance but then the wear amount in the refractory product is increased, causing a problem of deterioration in slab quality.

The carbon content exerts a great influence on physical properties and other properties of the CaO and MgO-containing refractory product, as mentioned above. Thus, first of all, the carbon content is set in the range of 2 to 35 mass %. Then, as to the remainder, the total content of one or more metal oxides selected from the group consisting of $B_2O_3$, $TiO_2$, $V_2O_5$, $P_2O_5$ and $SiO_2$ is determined to be in the range of 0.1 to 5.0 mass % so as to obtain high slaking resistance of CaO particles and other effect, and the resulting remainder is composed of CaO and MgO. Thus, the total content of CaO and MgO is in the range of 60 to 97.9 mass %. It is to be understood that impurities such as alkali metal oxides, ferrioxides and aluminum oxides can be inevitably contained, and the total content of the inevitable impurities is generally 2 mass % or less.

Meanwhile, while the refractory product having the aforementioned chemical composition exerts excellent anti-alumina adhesion effect, it is difficult to completely avoid contact with moisture or water in a production stage, in a transportation stage, during storage by a customer or user, and during a setting operation, and such situations involve a risk of inducing a CaO hydration reaction.

Therefore, it is essential to solve the aforementioned technical problem, i.e., to prevent a slaking problem caused by hydration of CaO in a refractory product, in a production stage, during storage and in a casting stage, at high levels or reliably over long periods. The anti-hydration technique will be described below.

As is well known, CaO easily undergoes a hydration reaction according to the following reaction formula:

$$CaO + H_2O = Ca(OH)_2$$

In this reaction, standard free energy of formation $\Delta G°$ is $-57.8$ kJ/mol (T=298 K).

As mentioned above, in order to prevent the hydration of CaO, an approach for lowering an activity factor of CaO in clinker to inactivate CaO, and an approach for forming a dense, stable, water-impermeable film on a surface of a CaO-containing particle at least at a finished product stage, have primarily been pursued. The former approach has been tried by employing a technique of forming a compound with a metal oxide such as $TiO_2$. However, it is necessary to add the metal oxide in an excessively large amount in order to achieve the inactivation of CaO, so that activity contributing to reactivity of CaO itself, i.e., an activity factor of CaO, is significantly lowered, and reactivity with alumina-based inclusions in steel is significantly deteriorated, causing a problem in terms of an anti-clogging effect. Moreover, the compound formation is more likely to lead to a lowering in melting point. Further, an anti-hydration function of clinker is far from sufficient. In the latter approach, the film is an extremely-thin (0.05 to 4 μm-thick) carbonated film or an oil-based film. Thus, a part or an entirety of the film is broken or lost during a production process of a refractory product, particularly during kneading, heat treatment and processing process of refractory raw materials, which makes it difficult to exert sufficient slaking resistance The inventers of the present invention have diligently studied to radically solve the above technical problem. As a result, the inventers have obtained a finding that a thermodynamically hydration-free, stable inorganic film can be selectively formed in each CaO surface by dispersing one or more metal oxides selected from the group consisting of $B_2O_3$, $TiO_2$, $V_2O_5$, $P_2O_5$ and $SiO_2$, in a shaped refractory mixture with carbon, in an amount of 0.1 to 5.0 mass %, in terms of a value converted into an amount thereof to be contained in an intended refractory product which has undergone a heating treatment in a non-oxidizing atmosphere at 1000° C., and then subjecting the resulting shaped refractory mixture to a heat treatment process, specifically a heat treatment under a non-oxidizing atmosphere at 800° C. or more, to induce a contact reaction between the one or more metal oxides and the CaO, and finally accomplished the present invention. As used in the present invention, the term "inorganic film" includes a solid solution layer and an amorphous layer, in addition to a compound layer.

An example of the inorganic film (compound) to be formed in each CaO surface in the present invention is as follows:

$3CaO.B_2O_3(+32.0$ kJ/mol$)$, $2CaO.B_2O_3(+44.1$ kJ/mol$)$, $CaO.B_2O_3(+82.4$ kJ/mol$)$ $3CaO.2TiO_2(+12.4$ kJ/mol$)$, $4CaO.3TiO_2(+16.8$ kJ/mol$)$, $CaO.TiO_2(+24.4$ kJ/mol$)$ $3CaO.V_2O_5(+52.9$ kJ/mol$)$, $2CaO.V_2O_5(+74.6$ kJ/mol$)$, $CaO.V_2O_5(+88.2$ kJ/mol$)$ $3CaO.P_2O_5(+236$ kJ/mol$)$, $2CaO.P_2O_5(+280.7$ kJ/mol$)$ In parentheses, a change in free energy ($\Delta G$, at 298 K) during a hydration reaction for each compound is indicated. In all of these inorganic compounds, $\Delta G$ has a plus value, which shows that no hydration reaction occurs.

Further, an example of an $SiO_2$-based compound is as follows:

$3CaO.SiO_3(-17.5$ kJ/mol$)$, $2CaO.SiO_2(+3.3$ kJ/mol$)$, $CaO.SiO_2(+33.9$ kJ/mol$)$ The compound $3CaO.SiO_3$ indicates the possibility of occurrence of hydration reaction. However, the inventors found out that even an inorganic film including an $SiO_2$ component can be stabilized as a film significantly excellent in slaking resistance, by using it in combination with one or more of the above components having high binding stability with respect to CaO ($B_2O_3$, $TiO_2$, $V_2O_5$, $P_2O_5$), or by producing calcium carbonate through a reaction with CaO in the film, i.e., fixing free CaO in the film, using $CO_2$, as described later.

An inside of a carbon-containing refractory product is low in oxygen partial pressure, so that an oxide having a high vapor pressure is more likely to fill a microstructure of the refractory product in the form of a gas component, and the gas component selectively undergoes reaction at each surface of the CaO-containing particles in the microstructure to produce an inorganic film. Otherwise, the oxide comes into direct contact with the CaO component in the form of a liquid or solid phase to produce a similar inorganic film. As to the metal oxides to be used in the present invention, melting points of $P_2O_5$, $B_2O_3$, $V_2O_5$, $SiO_2$ and $TiO_2$ are about 350° C. (sublimation), about 450° C., 695° C., 1710° C. and 1870° C., respectively. Among them, $P_2O_5$, $B_2O_3$ and $V_2O_5$ are particularly low in melting point and thereby high in vapor pressure. Therefore, in the present invention, $B_2O_3$ and $V_2O_5$ are particularly preferred metal oxides for use in forming an inorganic film in each CaO surface.

On the other hand, each of $SiO_2$ and $TiO_2$ has a melting point which is not low as compared with $P_2O_5$, $B_2O_3$ and $V_2O_5$, and thereby has a relatively low vapor pressure, so that a contact reaction with CaO in the form of a gas or liquid phase cannot be expected. However, in this case, a technique of allowing $SiO_2$ and/or $TiO_2$ to come into direct contact with surfaces of the CaO-containing particles can be used to form a hydration-resistant inorganic film. Each of $B_2O_3$, $V_2O_5$ and $P_2O_5$ also has a function of enhancing a reactivity of each of $SiO_2$ and $TiO_2$ and lowering an activity factor of CaO in the inorganic film. Thus, the use of $SiO_2$ and/or $TiO_2$ in combination with $B_2O_3$, $V_2O_5$ and/or $P_2O_5$ makes it possible to facilitate formation of a desired inorganic film with high coatability.

As above, the above metal oxides may be selected in a number of one or more. Then, the selected one or more metal oxides are incorporated into the refractory product in a total amount of 0.1 to 5.0 mass %, which makes it possible to form a desired inorganic film in each CaO surface. If the content is less than 1 mass %, no film can be formed. If the content is greater than 5 mass %, a resulting film has an excessively large thickness, so that film defects are more likely to occur.

Basically, the inorganic film produced by a reaction between CaO and the one or more metal oxides is thermodynamically stable, and free of inducing a hydration reaction, as mentioned above. Thus, even in the event of contact with water, the inorganic film is kept stable without any change in itself. In order to prevent a hydration reaction of active CaO existing inside the inorganic film, it is critical to meet the following requirements: (a) a produced inorganic film is stable with respect to water; (b) surfaces of the CaO-containing particles are uniformly coated with the stable inorganic film; and (c) the inorganic film is a non-porous film and a defect-free film without any crack and peeling.

As for the requirement (a), the inorganic film to be produced in the present invention is stable, because it is not thermodynamically hydrated, as mentioned above. As for the requirement (b), at least CaO surfaces of CaO-containing particles can be coated in the aforementioned manner. In view of film defects in the requirement (c), a thickness of the produced film is important. A study on a film thickness was performed using various inorganic films produced in the present invention. As a result, a film thickness required for providing a desired film excellent in slaking resistance and free of crack and peeling is in a range of 0.1 to 25 μm, preferably in a range of 0.1 to 10 μm. If the film thickness is less than 0.1 μm, it becomes difficult to produce a continuous coating layer so that continuity of coating is lost, causing deterioration in slaking resistance. On the other hand, if the film thickness is greater than 25 μm, crack or peeling is more likely to occur in a resulting film due to a difference in thermal expansion between the particle and the film, resulting in deterioration in slaking resistance.

As to formation of a defect-free film in the requirement (c), slaking resistance is largely improved by setting the film thickness in the range of 0.1 to 25 μm, as mentioned above. However, under more severe conditions, for example, in a situation where the film is left in a hot and humid atmosphere for a prolonged period of time, a hydration reaction is likely to gradually progress due to micro-defects existing in the film. Therefore, in addition to the study for specifying the film thickness, the inventors further studied means for forming a defect-free film. As a result, it was found that a previously unachievable, extremely excellent slaking resistance can be obtained by allowing the refractory product having the film formed in each CaO surface in the above manner to react with a carbon dioxide gas in a temperature range of 380 to 830° C. which is equal to or less than a temperature causing calcium carbonate ($CaCO_3$) to decompose, thereby subjecting the refractory product to a carbonation treatment via defects in the film. The significant improvement in slaking resistance is achieved, because a part of $CO_2$ intruding via the film defects at high temperatures produces a calcium carbonate film in each surface of the CaO-containing particles to prevent slaking, and further a part of CaO constituting the film reacts with $CO_2$ to produce calcium carbonate, primarily, in opening areas and weakened areas such as cracks, of the film, so that the film defects are eliminated.

In order to further significantly improve slaking resistance as mentioned above, it is necessary that $CaCO_3$ produced by a reaction with carbon dioxide gas is contained in the refractory product in a range of 0.1 to less than 2.5 mass %. If the $CaCO_3$ content is less than 0.1 mass %, the intended effect is scarcely exerted. If the $CaCO_3$ content is equal to or greater than 2.5 mass %, $CO_2$ gas is generated during casting or during preheating depending on preheating condition before casting, which is likely to undesirably cause problems in casting operation, such as a boiling phenomenon in which a level of molten steel in a casting mold largely changes, and splashing in an initial stage of pouring.

As above, in the present invention, as a way for preventing hydration of CaO, with a focus on a mechanism that, during the course of a heat treatment for a shaped refractory mixture comprising carbon, and CaO and/or MgO-containing refractory particles, one or more of $B_2O_3$, $TiO_2$, $V_2O_5$, $P_2O_5$ and $SiO_2$ react with at least CaO surfaces of CaO-containing ones of the refractory particles to form an inorganic film stable to hydration, a technique of forming a CaO-based inorganic film capable of suppressing hydration, inside a refractory product through a heat treatment, is employed to suppress the hydration. Further, with a focus on defects in the formed film, in addition to control a thickness of the film to an adequate value, the refractory product having the film is subjected to a heat treatment in a carbon dioxide gas in a high temperature range equal to or less than a decomposition temperature of calcium carbonate. This makes it possible to achieve defect-freeness of the film in each CaO surface in a microstructure of the refractory product. As a result of employing these elemental techniques, it becomes possible to significantly improve slaking resistance at a previously unachievable level. As mentioned above, the present invention is a technique which utilizes a reaction during a heat treatment for a shaped refractory mixture comprising CaO and/or MgO-containing refractory particles to form a thermodynamically stable, defect-free inorganic film, in each surface of the refractory particles constituting a microstructure of a resulting refractory product. In this respect, the present invention is essentially different from the conventional technique intended to, in a stage of preparation of a raw material, form a film in each particle of the raw material (in this case, it is highly likely that an anti-slaking effect will be lost in a subsequent stage).

Secondly, a technique of lowering a thermal expansion of a material comprising CaO and/or MgO-containing refractory particles to reduce a risk of breaking due to thermal shock or thermal expansion difference during preheating or casting will be described.

Generally, a basic material such as CaO or MgO has a strong ion-binding property and thereby exhibits a high expansion characteristic as compared to other refractory particles. Considering a microstructure of a refractory product formed using basic particles in combination with a binder component and other particles, an amount of thermal expansion in the refractory product generally becomes larger in proportion to a rate of the presence of high-expansion refractory particles (aggregate). It is believed that this is because a thermal expansion amount of a refractory product in which various types of refractory particles different in particle size are bound by a binder component follows so-called "additivity rule", i.e., the rule that a total thermal expansion amount of a plurality of materials is determined by respective rates of contribution to thermal expansion amount, depending on volume fractions of the materials Generally, a microstructure of a carbon-containing refractory product comprises refractory particles different in particle size, carbonaceous matrix, open pores randomly existing in the microstructure, and closed pores confined in the particles and matrix. In a microstructure of a refractory product comprising carbon and refractory particles (high-expansion particles) each containing either one or both of a CaO component and an MgO component, the inventors focused on pore morphology around each of the refractory particles. Specifically, the inventors found that a lowering of expansion in a refractory product comprising high-expansion particles can be realized by forming a certain continuous void layer on each surrounding surface of the high-expansion particles.

More specifically, the refractory product of the present invention is prepared to have a microstructure in which, in a product stage, a void layer having a predetermined thickness (predetermined thick void layer) is formed at an interface between a three-dimensionally continuous carbonaceous matrix and each of the high-expansion refractory particles existing in the carbonaceous matrix and having a thermal expansion greater than that of the carbonaceous matrix, in such a manner as to surround the high-expansion refractory particle.

In the present invention, a predetermined thick void layer is formed around each high-expansion particles, for the purpose of preliminarily forming, around the high-expansion particle, an expansion-absorbing zone for allowing the high-expansion particle in the microstructure to freely expand when the refractory product undergoes temperature changes during preheating, casting or cooling, thereby absorbing thermal expansion of the particle up to a predetermined temperature by the void layer around the particle inside the refractory to prevent the thermal expansion of the particle from emerging as an thermal expansion amount of the refractory product. The presence of the void layer around each particle makes it possible to dramatically lower the thermal expansion amount of the refractory product.

In view of the thermal expansion amount, it is preferable that the thickness of the void layer around each refractory aggregate particle is set as large as possible, and the void layer is formed around each surface of all of the refractory particles having a thermal expansion amount greater than that of carbon. However, the formation of the void layer around each surface of the refractory particles may cause deterioration in material strength. Thus, it is necessary to adjust the thickness of the void layer while achieving a balance between the thermal expansion amount and the strength.

The formation of the void layer around each of the refractory particles is primarily based on a chemical reaction in a surface of the refractory particle during the course of an aftermentioned refractory product production process. Assuming basis raw material particles having a particle size distribution, the void layer is fundamentally formed around the entire surface of each particle in a microstructure of a refractory product, because the void layer is formed through a chemical reaction after a film such as a hydrate layer is preliminarily formed in a surface of each particle in the microstructure of the refractory product. Therefore, considering a ratio of a void layer thickness to a particle size (ratio of a void layer thickness per particle: MS value (microspace value), the MS value becomes smaller along with an increase in the particle size, and becomes larger along with a decrease in particle size. Thus, knowing an MS value of a coarse particle is equivalent to knowing allows a lower limit of the ratio of a void layer thickness per particle in the microstructure of the refractory product. Thus, the microstructure can be roughly evaluated based on the MS value in the microstructure.

The MS value herein is a ratio of a thickness L of a void layer between a coarse particle and the carbonaceous matrix (specifically, L is a total of thicknesses of void layers on opposite sides of the coarse particle) to a diameter D of the course particle, and calculated by the following formula:

$$MS = L/D \times 100(\%)$$

In other words, the MS value represents a minimum value of a ratio of the expansion-absorbing zone existing around each particle in the microstructure. The inventors calculated the MS value (a ratio of a void layer thickness around a particle surface) (%) in the following manner. Through microscopic observation of a microstructure of a refractory product, ten course particles are selected in descending order of particle size, and an arbitrary line passing through a center of a circle inscribed in each of the course particles is drawn. Further, three lines passing through the center of the circle are drawn at a 45-degree pitch with reference to the arbitrary line. That is, total four lines are drawn per course particle. Then, a length (D1, D2, D3, D4) between contour points of the course particle on opposite ends of each of the lines, and a total thickness (L1, L2, L3, L4) of void layers located on the opposite ends of each of the lines and in an interface between the course particle and the carbonaceous matrix are measured. Then, MS1, MS2, MS3 and MS4 are calculated by the above formula using the values obtained using the four lines, and an average of them is calculated as an MS value (a ratio of a void layer thickness per particle) of one of the course particles. Respective MS values of the pre-selected ten particles are calculated in the above manner, and averaged to obtain an MS value of the microstructure.

In the above process, an MS value of the microstructure is obtained by averaging respective MS values of ten course particles selected in descending order of particle size. This is one way to obtain an MS value of a maximum-size particle in a microscopic observation field. Specifically, considering measurement error, an average of respective MS values of ten course particles selected in descending order of particle size is obtained and deemed as an MS value of a maximum-size particle in a microscopic observation field (the MS value of the maximum-size particle will hereinafter be referred to simply as "MS value").

As a result of diligent studies on a lowering of expansion in a microstructure of a carbon-containing refractory product combined with a high-expansion basic raw material, the inventors have ascertained that a thickness of the void layer on a surface of each particle, which allows an expansion lowering effect to be exhibited while achieving a balance between strength and corrosion/abrasion resistance, is, in terms of a thickness of the void layer on a surface of a maximum-size particle, in the range of 0.05 to 1.5% of a particle size of the maximum-size particle. The void layer exists at two positions on opposite sides of each particle. Thus, on the assumption that the MS value is expressed by a ratio of a total thickness of void layers located on opposite sides of the maximum-size particle to the particle size of the maximum-size particle, the physical properties improvement effect is obtained when the MS value is in the range of 0.1 to 3.0%.

For example, from the point of view of the thermal expansion amount, a thermal expansion of a basic raw material (aggregate particles) containing CaO and MgO is generally 2.0% or more at 1500° C. Supposing that the aggregate expands by 2.4% at 1500° C., while estimating that a thermal expansion of a carbonaceous matrix surrounding the aggregate particles is 0.4% at the same temperature, a difference therebetween is 2.0%. A casting temperature in steel making is about 1500° C. Thus, as long as a ratio of a void layer thickness to a particle size of the particle is set to 2.0% or more, a void around the particle, i.e., an expansion-absorbing zone around the particle, is left without disappearance due to the thermal expansion difference, in other words, the high-expansion aggregate is not brought into contact with the carbonaceous matrix in a temperature range less than 1500° C. As a result, a macroscopic thermal expansion amount of the refractory product in a temperature range less than 1500° C. is dominated by a thermal expansion amount of the carbonaceous matrix, without following the conventional additivity rule, so that it becomes possible to allow the refractory product to exhibit a significantly low-expansion characteristic. Thus, from the point of view of the thermal expansion amount, the lowering of expansion can be realized by allowing individual particles to have a lager ratio of a void layer thickness (expansion-absorbing zone). Further, in order to allow such a low-expansion characteristic to be significantly exhibited, the carbonaceous matrix needs to be three-dimensionally continuous, and it is desirable to use particles having a particle size distribution including a not-so-large amount of fine powder.

On the other hand, from the point of view of the mechanical strength, the formation of the void layer around each particle becomes a factor causing deterioration in the strength, and deterioration in corrosion resistance against molten steel and abrasion resistance against molten steel. Taking a PET bottle as an analogy, this resembles a phenomenon that, when the PET bottle is filled with a content, a structural strength required for a PET bottle can be obtained, whereas, when the PET bottle is not filled with the content, the strength becomes lower, for example, buckling occurs when an external force is applied thereto. Specifically, if an excessive void layer exists on a surface of each refractory particle, the refractory particle corresponding to the content has difficulty in applying an appropriate internal pressure to a surrounding carbonaceous partition wall (matrix) corresponding to the PET bottle, so that enhancement in reinforcing the carbonaceous partition (a carbonaceous partition wall reinforcement effect) is weakened, and, the in extreme cases, the carbonaceous partition wall is damaged due to its deformation, which leads to deterioration in material strength.

In inventers' calculation, 2.0% is enough for the MS value, as mentioned above. However, in a microstructure of an actual refractory product, a range of the MS value capable of achieving a balance between the strength and the thermal expansion is extended up to a value (3.0%) slightly greater than 2.0%. If the MS value is greater than 3.0%, the above undesirable situation will occur all over the microstructure at the level of the casting temperature, which causes deterioration in macroscopic material strength, and deterioration in physical properties such as corrosion resistance and abrasion resistance. If the MS value is less than 0.1%, the expansion lowering effect cannot be obtained although the mechanical strength is good.

As above, in the present invention, a void layer is formed around respective refractory particles each containing either one or both of a CaO component and an MgO component in a microstructure of a refractory product, so that it becomes possible to lower a thermal expansion of the refractory product comprising the refractory particles to overcome weakness regarding thermal shock resistance due to a high expansion characteristic of the refractory particles, which allows the refractory product to be used in various articles including a casting nozzle.

In a casting temperature range (about 1500° C.), a thickness of the void layer around the refractory particle containing either one or both of a CaO component and an MgO component is reduced by expansion of the particle itself, so that there is almost no risk that this void space causes deterioration in corrosion resistance and others of the refractory product.

Meanwhile, the refractory product of the present invention is based on a function of suppressing adhesion or deposition of molten steel-derived alumina-based oxides (so-called "inclusions") onto a surface thereof during casting.

In order to enhance such alumina adhesion-resistance in conformity to requirements such as individual casting conditions, the above refractory product may further contain one or both of SiC and $Si_3N_4$, in an amount of 20 mass % or less (preferably, in the range of 0.5 to 20 mass %), individually or in total, or metal Si in an amount of 2 mass % or less (preferably, in the range of 0.3 to 2 mass %). They may be used in a coexistent manner. In other words, the refractory product of the present invention may contain either one or both of SiC and $Si_3N_4$, and metal Si, in an amount of up to 22 mass % which is a sum of: 20 mass % as a maximum value of the content of either one or both of SiC and $Si_3N_4$; and 2 mass % as a maximum value of the content of metal Si, with the remainder being the components described in any one of the sections (1) to (3).

As mentioned above, a $CaO$—$Al_2O_3$ based slag layer is produced at an interface of the refractory product through a reaction between a CaO component in the refractory product and $Al_2O_3$ produced by precipitation of in-steel aluminum. In aluminum killed steel containing S (sulfur) in a concentration of 20 ppm or more, particularly, 40 ppm or more, a high-melting-point compound CaS is produced in the slag layer by a desulfurization ability of the $CaO$—$Al_2O_3$ based slag phase produced at the refractory product-molten steel interface, in some cases. Particularly, in the case where CaS is produced in the form of a layer, supply of CaO in the refractory product toward molten steel is cut off, so that alumina is apt to adhere to the interface of the refractory product. The inventers found that incorporating a component capable of, during casting, continuously supplying an $SiO_2$-based component having a function of lowering the desulfurization ability of the slag phase, into the CaO-containing refractory product of the present invention, is effective as a countermeasure against adhesion of alumina, particularly, in steel which contains S (sulfur) in a high concentration, onto the surface of the refractory product.

Direct addition of an $SiO_2$ component into the refractory product is undesirable because it causes a rapid reaction with CaO in the refractory product to produce a low-melting-point substance. Therefore, an $SiO_2$ component is directly added only for forming an anti-slaking film, and an amount of the addition is limited to 5 mass % or less. The present invention is based on a finding that it is most preferable to employ a technique of incorporating one or both of SiC and $Si_3N_4$ components into the refractory product, as a supply source for continuously supplying an $SiO_2$ component to a molten steel-refractory product interface. The SiC or $Si_3N_4$ component is subjected to oxidation by a reaction with an atmosphere in the refractory product or by in-steel oxygen, thereby continuously supplying an $SiO_2$ component into a $CaO$—$Al_2O_3$ based slag layer produced at the interface.

Depending on a content of in-steel S (sulfur), a minimum content of SiC and $Si_3N_4$ components for obtaining the above effect is preferably set to 0.5 mass % or more in total. Further, a maximum content of SiC and $Si_3N_4$ components is preferably set to 20 mass % or less. If the content is greater than 20 mass %, lowering of melting point (increase in amount of a liquid phase) is accelerated due to coexistence of an $SiO_2$ component supplied from the SiC and/or $Si_3N_4$ components, the CaO component in the refractory product and in-steel alumina, so that corrosion resistance of the refractory product is deteriorated to an extent causing deterioration in durability required as a casting nozzle, and an amount of inclusions toward steel is more likely to be increased.

As a $SiO_2$ source, metal Si may also be used to obtain the same alumina-adhesion suppressing effect. In this case, metal Si is preferably contained in an amount of 2 mass % or less, because it has a negative effect, for example, of increasing strength, causing deterioration in thermal shock resistance.

Meanwhile, the $CaO$—$Al_2O_3$ based melt produced at the interface of the refractory product of the present invention easily flows toward a downstream side through contact with a molten steel stream. If there is a local difference in terms of conditions on a molten steel stream and others, in a surface of the refractory product to be subjected to a contact with molten steel, the refractory product is likely to be largely damaged. The inventers found that incorporating a $ZrO_2$ component into a $CaO$—$Al_2O_3$ based composition makes it possible to improve stability of a film based on the $CaO$—$Al_2O_3$ based composition, thereby effectively suppressing the damage. Particularly, in a $CaO$—$Al_2O_3$ based composition comprising a $SiO_2$ component, it is effective to incorporate a $ZrO_2$ component thereinto.

In order to stabilize such a $CaO$—$Al_2O_3$ based or $CaO$—$Al_2O_3$—$SiO_2$ based film, $ZrO_2$ is additionally contained in the refractory product described in any one of the sections (1) to (3), preferably, in an amount of 5 mass % or less. The content of $ZrO_2$ should be secondarily determined by a factor which varies depending on a balance between individual casting conditions such as a molten steel temperature, and an amount of aluminum or alumina contained in molten steel as inclusions, and components of the refractory product, for example, a level of a low-melting-point substance to be produced at the surface of the refractory product. Thus, the content of $ZrO_2$ is not a fixed value, but may be determined depending on individual casting conditions. However, if the content is greater than 5 mass %, the lowering of melting point is suppressed (reduction in amount of a liquid phase) even under coexistence of $ZrO_2$, the CaO component in the refractory product and in-steel alumina, or $SiO_2$, so that viscosity of the film is increased, and adhesion of in-steel inclusions including alumina onto the surface of the refractory product is accelerated. In other words, the refractory product of the present invention may contain $ZrO_2$ in an amount of up to 5 mass %, with the remainder being the components described in any one of the sections (1) to (3). A lower limit of the $ZrO_2$ content may be determined individually and arbitrarily in an amount required for arbitrarily increasing viscosity of the surface of the refractory product to an intended level, according to a degree of softening (an amount of a liquid phase, etc.) in the surface which varies depending on an initial composition (such as CaO, MgO, $Al_2O_3$ and $SiO_2$) of the refractory product and an actual composition of the refractory product to be changed during casting. In this respect, while it is not exactly appropriate to set the lower limit of the $ZrO_2$ content, the effect of $ZrO_2$ is significantly exhibited in an amount equal to or greater than about 0.5 mass %.

It is possible to use $ZrO_2$, SiC, $Si_3N_4$ and metal Si in a coexistent manner. In other words, the refractory product of the present invention may contain either one or both of SiC and $Si_3N_4$, metal Si and $ZrO_2$ in an amount of up to 27 mass % which is a sum of: 20 mass % as a maximum value of the content of either one or both of SiC and $Si_3N_4$; 2 mass % as a maximum value of the content of metal Si; and 5 mass % as a maximum value of the content of $ZrO_2$, with the remainder being the components described in any one of the sections (1) to (3).

Effect of the Invention

A refractory product using refractory particles each containing either one or both of a CaO component and MgO component, such as dolomite clinkers, has the following effects.
1. The feature of forming the film in at least each CaO surface makes it possible to reliably prevent a slaking problem due to hydration of CaO in a production stage, during storage and in a casting stage, over long periods.
2. The feature of subjecting the refractory product having CaO surfaces each coated with the inorganic film is subjected to a carbonation treatment to additionally form calcium carbonate ($CaCO_3$) makes it possible to further improve slaking resistance.
3. The feature of forming a microstructure which has a void layer with a thickness of 0.1 to 3.0% in terms of the MS value, between the carbonaceous matrix and a respective one of the refractory particles each containing either one or both of a CaO component and an MgO component, makes it possible to largely reduce a thermal expansion of the refractory product using the CaO and/or MgO-containing refractory particles and thus reduce a risk of breaking due to thermal shock or thermal expansion difference during preheating or casting.
4. The feature of incorporating one or more of SiC, $Si_3N_4$ and metal Si into the refractory product makes it possible to enhance alumina adhesion-resistance in conformity to individual casting conditions, etc.
5. The feature of further incorporating $ZrO_2$ into the refractory product makes it possible to protect the refractory product while achieving a better balance between alumina adhesion-resistance and erosion/corrosion resistance (including resistance to wear and abrasion losses) of the refractory product in conformity to individual casting conditions, etc.
6. The refractory product of the present invention can be used in a casting nozzle. This makes it possible to provide a casting nozzle which is excellent in slaking resistance, crack resistance, alumina adhesion-resistance and wear resistance, and capable of allowing stable casting.

BRIEF DESCRIPTION OF THE DRAWINGS

FIG. 1 illustrates one type of immersion nozzle (casting nozzle) using a refractory product of the present invention, wherein FIG. 1A, FIG. 1B and FIG. 1C are, respectively, one example in which the immersion nozzle is composed of the refractory product of the present invention entirely except for a powder line portion, another example in which the immersion nozzle is composed of the refractory product of the present invention entirely except for a powder line portion, as with the example in FIG. 1A, and formed in a different shape, specifically, as a flat-shaped immersion nozzle primarily used for thin slab casting, and yet another example in which the immersion nozzle in FIG. 1A is modified such that a part of an inner bore portion thereof has a gas injection function, and the refractory product of the present invention is arranged in the remaining part of the inner bore portion and around a discharge port.

FIG. 2 illustrates another type of immersion nozzle (casting nozzle) in which the refractory product of the present invention is integrally formed with a nozzle body refractory member, wherein FIG. 2A, FIG. 2B and FIG. 2C are, respectively, one example in which the refractory product of the present invention is arranged in an inner bore portion, another example in which the refractory product of the present invention is arranged in an inner bore portion and around a discharge port, and yet another example in which the immersion nozzle in FIG. 2B is modified such that the inner bore portion has a gas injection function in an upper region thereof, and the refractory product of the present invention is arranged in a lower region of the inner bore portion and around the discharge port.

FIG. 3 illustrates yet another type of immersion nozzle (casting nozzle) in which a layer composed of a carbonaceous sheet or mortar is provided between a nozzle body refractory member and the refractory product of the present invention, wherein FIG. 3A, FIG. 3B and FIG. 3C are, respectively, one example in which the refractory product of the present invention is arranged in an inner bore portion, another example in which the refractory product of the present invention is arranged in an inner bore portion and around a discharge port, and yet another example in which the immersion nozzle in FIG. 3B is modified such that the inner bore portion has a gas injection function in an upper region thereof, and the refractory product of the present invention is arranged in a lower region of the inner bore portion and around the discharge port. In FIG. 3, the layers may be integrally formed, or may be assembled together after being formed separately.

FIG. 9 illustrates a test piece for an in-molten steel rotation test, wherein FIG. 9A is a front view, and FIG. 9B is a top plan view.

FIG. 11 is a photograph of a microstructure of an inventive sample 31, wherein FIG. 11A illustrates the microstructure before a heat treatment, and FIG. 11B illustrates the microstructure after the heat treatment.

DESCRIPTION OF EMBODIMENTS

Figure 1:
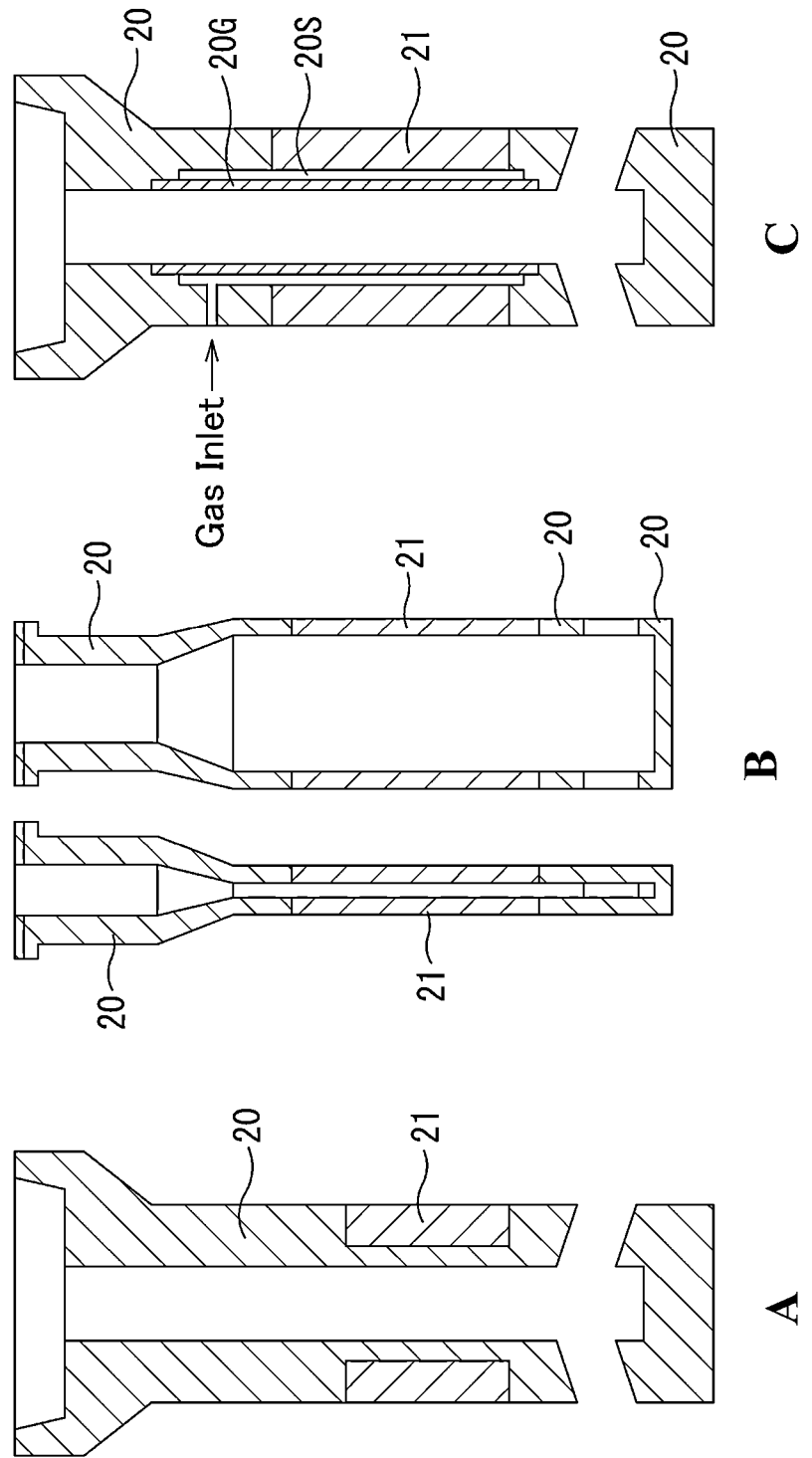

A refractory product of the present invention is based on a premise that it comprises CaO component-containing refractory particles and MgO component-containing refractory particles. In this regard, the term "CaO component-containing refractory particles and MgO component-containing refractory particles" or "refractory particles each containing either one or both of a CaO component and an MgO component (CaO and/or MgO-containing refractory particles)" includes the following three types.

(1) Refractory particles each containing both a CaO component and an MgO component (2) A combination of CaO component-containing refractory particles (devoid of an MgO component), and MgO component-containing refractory particles (3) A combination of MgO component-containing refractory particles (devoid of a CaO component), and CaO component-containing refractory particles.

The refractory product of the present invention may be made up using one or more of the three types of refractory particles, as primary aggregate particles. That is, in the present invention, the term "CaO component-containing refractory particles and MgO component-containing refractory particles" is a concept which encompasses the case where they consist only of the first type of refractory particles, i.e., refractory particles each containing both a CaO component and an MgO component.

The first type of refractory particles may include clinkers obtained by subjecting natural dolomite to a heat treatment, or clinkers artificially synthesized from a CaO-containing raw material and an MgO-containing raw material in the form of integral particles (so-called "synthetic MgO—CaO clinkers").

In the second type of refractory particles, the "CaO component-containing refractory particles (devoid of an MgO component)" may include clinkers artificially synthesized from a CaO-containing raw material in the form of CaO-based particles, and may be refractory particles containing carbonated or hydroxylated CaO. The second type of refractory particles may be a combination of the "CaO component-containing refractory particles (devoid of an MgO component)" and the first type of refractory particles.

In the third type of refractory particles, the "MgO component-containing refractory particles (devoid of a CaO component)" may include natural or artificially-synthesized, MgO-based, particle-form clinkers. Further, the "CaO component-containing refractory particles" may include one or both of the first type of refractory particles, and the "CaO component-containing refractory particles (devoid of an MgO component)" in the second type of refractory particles.

The refractory product of the present invention contains one or more metal oxides selected from the group consisting of $B_2O_3$, $TiO_2$, $V_2O_5$, $P_2O_5$ and $SiO_2$. As raw materials for the metal oxides, it is possible to use oxides of B, Ti, V, P and Si, or respective hydrates, colloidal substances and metal alkoxide substances of the oxides, individually or in combination. For example, as a preferred $B_2O_3$ source, it is possible to use boron oxide, tetraboric acid, metaboric acid, orthoboric acid or borate ester. Alternatively, it is possible to use a boric-acid compound such as sodium tetraborate or sodium metaborate, or borosilicate glass (An $R_2O$ (R=Na, K, Li) component may be contained in borosilicate glass. In this case, the $R_2O$ component is preferably contained in an amount of about 10 mass % or less with respect to 100 mass % of borosilicate glass). As a $TiO_2$ source, it is possible to use titanium oxide, organic titanium compound or colloidal dispersion. As a $V_2O_5$ source, vanadium oxide may be used. As a $P_2O_5$ source, it is possible to use phosphoric acid, phosphate or phosphoric ester. Further, as a $SiO_2$ source, it is possible to use silica fine powder, colloidal silica or a solution type of ethyl silicate.

It is necessary to allow the one or more metal oxides selected from the group consisting of $B_2O_3$, $TiO_2$, $V_2O_5$, $P_2O_5$ and $SiO_2$ to be dispersed around each of the CaO-containing particles. For this purpose, an aftermentioned dispersion method during kneading may be employed. In this case, it is preferable to use a raw material of the one or more metal oxides, in form of fine powder or liquid.

As mentioned above, a natural raw material can be used as refractory particles constituting the refractory product of the present invention. Such a natural raw material for use as the refractory particles, or other type of raw material produced from a starting material having a low purity, inevitably contains one or more components other than the aforementioned effective components (the one or more components will hereinafter be referred to simply as "inevitable components"). Further, during the production process, inevitable components can be inevitably mixed therein. Examples may be $Al_2O_3$, $Fe_2O_3$ and $R_2O$ (R=Na, K, Li). In some cases, such inevitable components are contained in the refractory particles, or in a film of at least each CaO surface of the refractory particles, or in any one or more locations in a matrix microstructure. A content of them is limited to about 3 mass % or less, preferably, about 2 mass % or less, more preferably, about 1 mass % or less. The content of the inevitable components can be adjusted to some extent, for example, by employing a technique of selecting each raw material whose effective components are high in purity, or a technique of enhancing cleaning or the like during the production process.

As a carbon source, a carbon raw material serving as a binder (binder carbon) may be used. For example, a phenolic resin, pitch or tar is preferable as the binder carbon, because they can leave residual carbon as a binding network, at a high rate after burning in a non-oxidizing atmosphere. As for a state in a raw material stage, it is possible to use, as each of the above raw materials, a type which is in a liquid state at room temperature, or a type which is in a solid state at room temperature but softened or liquidized along with an increase in temperature. In the present invention, in addition to the above essential raw materials, a solid carbonaceous raw material other than the binder carbon may be arbitrarily used. As the solid carbonaceous raw material other than the binder carbon, it is possible to use a particle-form carbonaceous raw material such as graphite or carbon black, or a fiber-form carbonaceous raw material such as carbon fibers.

However, it is necessary that these carbonaceous raw materials are added to a raw material mixture within a sum of a ratio of a loss of the binder carbon of a raw material (a ratio after subtraction of a ratio of residual carbon) and a ratio of a loss of the solid carbonaceous raw material (a ratio of impurities eliminated by heating), i.e., in the range of 2 to 35 mass % of the entire refractory product, in terms of a chemical composition measured in a product stage, i.e., after the refractory product has undergone heating in a non-oxidizing atmosphere at 1000° C.

The above raw materials are mixed so as to have the chemical composition defined in the appended claims. Then, a resulting mixture is subjected to kneading and shaping, and a resulting shaped mixture is subjected to a heart treatment under a non-oxidizing atmosphere at 800° C. or more.

In order to allow one or more metal oxides selected from the group consisting of $B_2O_3$, $TiO_2$, $V_2O_5$, $P_2O_5$ and $SiO_2$ to be dispersed around each of the CaO-containing particles during the above kneading, it is preferable that, prior to the kneading, $B_2O_3$, $TiO_2$, $V_2O_5$, $P_2O_5$ and $SiO_2$ additives are prepared in the form of a liquid or fine particles and directly added to the CaO-containing particles, individually or in combination.

Through the heat treatment under a non-oxidizing atmosphere at 800° C. or more, a film composed of a compound of CaO with the one or more metal oxides selected from the group consisting of $B_2O_3$, $TiO_2$, $V_2O_5$, $P_2O_5$ and $SiO_2$ is formed in at least each CaO surface of the CaO component-containing refractory particles, with a thickness of 0.1 to 25 µm. The thickness of the compound film can be measured by microscopic microstructure observation or X-ray micro analyzer. Further, the thickness of the compound film can be controlled, for example, by changing a ratio of the one or more additives selected from the group consisting of $B_2O_3$, $TiO_2$, $V_2O_5$, $P_2O_5$ and $SiO_2$.

The reason why the heat treatment is performed under a non-oxidizing atmosphere at 800° C. or more is to obtain a product of a reaction between the one or more metal oxides selected from the group consisting of $B_2O_3$, $TiO_2$, $V_2O_5$, $P_2O_5$ and $SiO_2$ and each of the CaO-containing particles, to an extent enough to suppress slaking of the CaO-containing particle. While an upper limit of the heat treatment temperature is not particularly limited, it is substantially set to about 1300° C., by economical reason. In view of a level of reaction progress and economic efficiency, an appropriate heat treatment time is in the range of about 1 to 6 hours at a maximum heat treatment temperature.

The slaking resistance of the CaO-containing particles each having the film formed in the above manner can be enhanced by a carbonation reaction between carbon dioxide gas and CaO under high temperatures. Specifically, the refractory product obtained by the above production method to have an inorganic film layer produced by a reaction between CaO and one or more of $B_2O_3$, $TiO_2$, $V_2O_5$, $P_2O_5$ and $SiO_2$ at each surface of the CaO-containing particles is further exposed to a carbon dioxide gas atmosphere in a temperature range of 380 to 830° C. to induce a carbonation reaction ($CaO+CO_2 \rightarrow CaCO_3$) at a defect area of the inorganic film layer in at least each CaO surface of the CaO-containing particles constituting the microstructure of the refractory product, and thereby produce $CaCO_3$ at the defect area of the inorganic film. This makes it possible to almost completely eliminate the defect area of the inorganic film and thereby significantly improve the slaking resistance of the refractory product. The reason for setting the treatment temperature in the range of 380 to 830° C. is to allow the treatment temperature to become equal to or greater than a value causing production of calcium carbonate ($CaCO_3$) and become equal to or less than a value causing decomposition of calcium carbonate ($CaCO_3$).

As used here, the term "defect area" of the inorganic film means a fine gas hole, crack, peeled area or the like existing in the inorganic film composed of a product of the reaction between CaO and the one or more metal oxides selected from the group consisting of $B_2O_3$, $TiO_2$, $V_2O_5$, $P_2O_5$ and $SiO_2$, in other words, a region in which CaO on each surface of the CaO-containing particles in the microstructure of the refractory product is not protected by the inorganic film composed of the reaction product, i.e., not shielded from the outside world.

This carbonation treatment is performed to allow $CaCO_3$ to be consequently produced in the CaO-containing refractory product in an amount of 0.1 to less than 2.5 mass %. If the content of $CaCO_3$ is equal to or greater than 2.5 mass %, a large change in molten steel level in a mold, i.e., so-called "boiling phenomenon", undesirably becomes prominent due to a decomposed gas of $CaCO_3$ in an initial stage of casting, which gives rise to a need for increasing a preheating temperature before casting to promote decomposition of $CaCO_3$. On the other hand, if the content is less than 0.1 mass %, $CaCO_3$ is not sufficiently produced, which makes it impossible to obtain an effect of enhancing slaking resistance. The $CaCO_3$ content can be controlled, for example, by changing a concentration of carbon dioxide gas, the treatment temperature, a treatment time or a pressure of carbon dioxide gas.

Further, in order to lower the thermal expansion to reduce the risk of breaking due to thermal shock or thermal expansion difference during preheating or casting, the refractory product of the present invention may be prepared to have a microstructure in which a void layer with a thickness of 0.1 to 3.0% in terms of the MS value (ratio of a void layer thickness) (%), is formed between the carbonaceous matrix and a respective one of refractory particles each containing either one or both of a CaO component and an MgO component, in the aforementioned manner.

In order to form the void layer on each surface of the CaO and/or MgO-containing refractory particles, a hydrate, chloride or carbonate layer is preliminarily formed on the surface to have a predetermined thickness, in a raw material stage or in a heat treatment stage in the production process, by a technique of bringing the particles into contact with one of: water or water-containing gas; and an acid or alkali solution or gas, for a predetermined time.

As the refractory particles each having a coating layer preliminarily formed on a surface thereof, it is preferable to use CaO and/or MgO-containing refractory particles having a predetermined thick coating layer, such as a hydrated layer, a chloride layer or a carbonate layer, formed through a chemical reaction with CaO or MgO. Preferably, this treatment as a pretreatment for the refractory particles each containing either one or both of a CaO component and an MgO component is performed using a gas or liquid, in view of forming the coating layer on each surface of the refractory particles each containing either one or both of a CaO component and an MgO component. Alternatively, it is possible to employ a technique of preliminarily dispersing hydroxide or carbonate compound in a refractory composition and then forming a compound layer on each CaO surface during the course of a heat treatment in a production or casting stage.

The predetermined thickness is not a fixed value, but may be set on a case-by-case basis depending on specific design conditions, while taking into account a difference between different compositions in terms of expansion/shrinkage characteristics caused by a reaction and others during forming the coating layer, so as to appropriately adjust a thickness of the void space with respect to a size of each particle having a surface to be subjected to formation of the coating layer, to fall within the above range of the MS value.

One example of a production method will be described below. Burnt dolomite (CaO.MgO) refractory particles each formed with a hydrated layer with a certain given thickness, a carbonaceous raw material, a boric acid component and an organic binder are mixed together and kneaded. Then, the kneaded mixture is adjusted to have appropriate formability, and formed into a given shape. The shaped mixture is subjected to a heat treatment under a non-oxidizing atmosphere at 1000° C. which is a temperature equal to or greater than a decomposition temperature of the coating layer (hydrated layer). Thus, the coating layer (hydrated layer) is decomposed, and a porous and active layer containing CaO and/or MgO is produced on each surface of the particles.

In this way, during the course of heating of the particles each having the predetermined thick coating layer, such as a hydrated layer, a chloride layer or a carbonate layer, on a surface thereof, one or more of the acid oxides: $B_2O_3$, $TiO_2$, $V_2O_5$, $P_2O_5$ and $SiO_2$, in the refractory composition, form a film in the entire region of each surface of the particles containing a basic oxide including CaO. Subsequently, the coating layer (hydrated layer) on each of the CaO and/or MgO-containing particles is decomposed, so that a region of the coating layer will be formed as a porous layer. In addition, the region where the coating layer such as a hydrated layer, a chloride layer or a carbonate layer has been decomposed is porous and active (this layer will hereinafter be also referred to simply as "active layer"), and thereby highly reactive with $B_2O_3$, $TiO_2$, $V_2O_5$, $P_2O_5$ and $SiO_2$, so that an inorganic film formed through the reaction with CaO is densified, and a thickness of the active layer which is originally porous will be reduced as a result of the densification. As above, at the stage of completion of the burning, a void space having a certain range of thickness is formed between the film formed around each surface of the high-expansion particles (CaO, MgO, etc) and a matrix consisting primarily of a carbonaceous component.

The thickness of the void layer, i.e., the thickness of the coating layer to be formed on each surface of the particles in an initial stage, can be adjusted, for example, by changing a concentration of a gas serving as a treatment agent, such as water vapor, a treatment temperature, a treatment time or a pressure of carbon dioxide gas.

The refractory product prepared by forming a void space around each surface of the CaO-containing particles and then forming a film of a compound of CaO with one or more metal oxides selected from the group consisting of $B_2O_3$, $TiO_2$, $V_2O_5$, $P_2O_5$ and $SiO_2$ may also be further subjected to the aforementioned carbonation treatment at a temperature ranging from 380° C. to 830° C. This makes it possible to provide a void space around each of the CaO-containing particles, as well as a strong CaO-based protective film, thereby obtaining a CaO-containing refractory product excellent in not only resistance to crack due to thermal shock and thermal expansion difference but also slaking resistance.

The refractory product of the present invention obtained in the above manner is suitably usable for a casting nozzle, because, when the refractory product is arranged in a part or an entirety of a region to be subjected to a contact with molten steel, it can suppress adhesion of molten steel-derived non-metallic inclusions, such as alumina, onto a surface thereof.

FIG. 1A illustrates an example of an immersion nozzle (casting nozzle) in which a refractory product 20 of the present invention described in any one of the section (1) to (4) is arranged in a part of a region to be subjected to a contact with molten steel, in the form of a single layer with a thickness ranging from a contact surface with molten steel to a back surface opposed thereto. In FIG. 1A, when the refractory product 20 of the present invention is also arranged in a powder line portion 21, an immersion nozzle (casting nozzle) is formed in which the refractory product 20 is arranged in an entire of a region to be subjected to a contact with molten steel, in the form of a single layer with a thickness ranging from a contact surface with molten steel to a back surface opposed thereto. While FIG. 1A illustrates an example of a circular cylindrical-shaped type, a casting nozzle using the refractory product of the present invention is not limited to a particular shape, such a circular cylindrical-shaped type. For example, the refractory product of the present invention can be used in immersion nozzles (casting nozzles) having various shapes, such as a flat shape, an elliptic shape or a funnel shape (a funnel shape having a diametrally enlarged upper portion), primarily used for thin slab casting, as illustrated in FIG. 1B.

Figure 12:
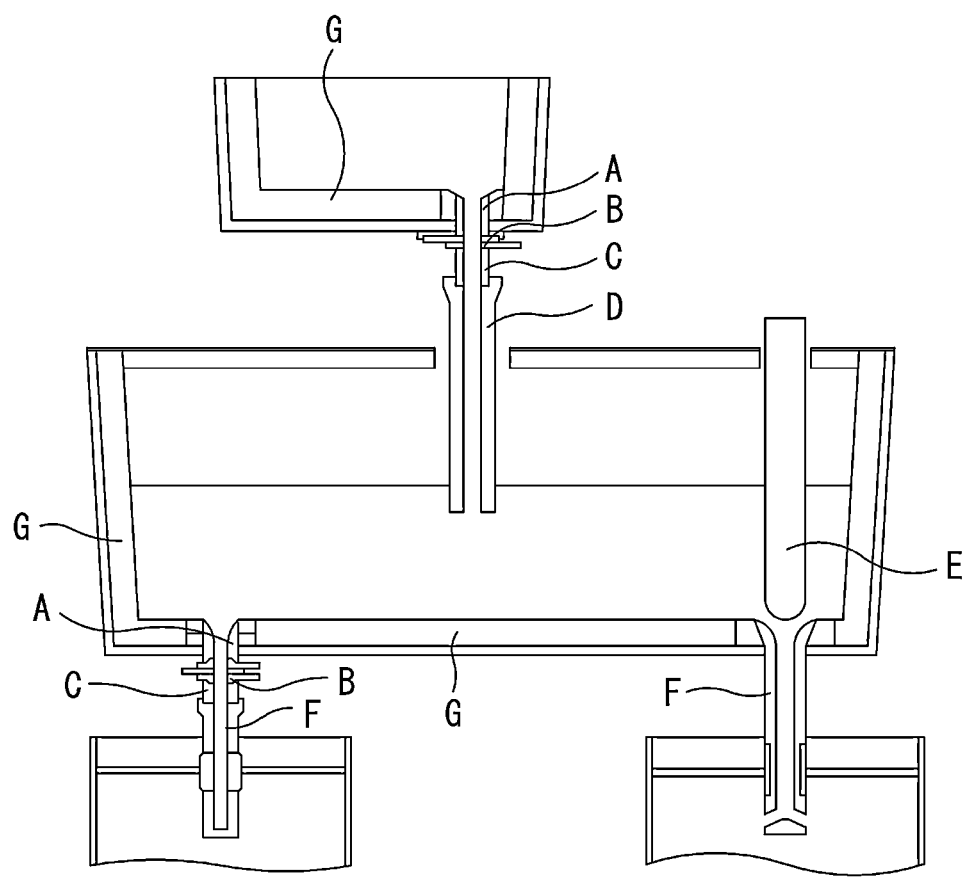
FIG. 12 is a vertical sectional view (conceptual diagram) illustrating a casting vessel, a stopper, a nozzle and a casting mold in continuous casting, wherein a left nozzle is one example of an outer-fitting type immersion nozzle in a structure where a nozzle section serving as a molten steel flow path during discharge of molten steel from the casting vessel is composed of a plurality of casting nozzle elements, and a right nozzle is one example of an inner-fitting type immersion nozzle, and wherein A to G indicate casting members for which the refractory product of the present invention can be used.

A left nozzle illustrated in FIG. 12 is an example of an outer-fitting type immersion nozzle in a structure where a nozzle section serving as a molten steel flow path during discharge of molten steel from the casting vessel is composed of a plurality of casting nozzle elements. The refractory product of the present invention can be used for not only an immersion nozzle F but also each of an upper nozzle A, a sliding nozzle plate B, a lower nozzle C and a long nozzle D, in the structure composed of a plurality of casting nozzle elements, in such a manner that it is arranged in a part or an entirety of a surface of the immersion nozzle F or the nozzle structure to be subjected to a contact with molten steel. The refractory product of the present invention can also be used for a so-called "inner-fitting type immersion nozzle" (a right nozzle in FIG. 12), and a so-called open nozzle which is not immersed in molten steel, each having a structure where a nozzle section serving as the discharge path is integrated into a single piece. Further, the refractory product of the present invention can be used as a stopper E disposed above the nozzle section to control a flow rate of molten steel or open and close the nozzle section, or a refractory liner material G for a molten steel vessel.

A position and level of alumina adhesion on the surface of the refractory product vary depending on individual casting conditions. Thus, the "part" or the "entirety" of the region to be subjected to a contact with molten steel is not a fixed area, but is determined by selecting the most desired area as a target to suppress aluminum adhesion, with respect to each of the individual casting conditions. In other words, the "part" or the "entirety" of the region is an arbitrarily determinable matter. The casting nozzle with a single-layer structure as in FIGS. 1A and 1B has a low risk of crack due to thermal expansion difference or the like. In addition, it is the simplest structure in view of production. In the production of such a single-layer casting nozzle, a target region inside a CIP molding mold may be filled with a raw material mixture for the refractory product of the present invention to form a single layer.

The refractory product 20 of the present invention is not necessarily homogeneous in one casting nozzle, but may be changed in composition or the like in each of a plurality of regions arbitrarily divided depending on individual conditions in order to equalize damage morphology or speed when such a factor varies depending on the regions. This also applies to aftermentioned examples in FIGS. 2 and 3.

FIG. 1C illustrates an example in which the immersion nozzle in FIG. 1A is modified to have a function of injecting gas from a part of an inner bore portion (inner wall surface) thereof into molten steel. In this example, a refractory member 22G having high gas permeability (hereinafter also referred to simply as "gas-permeable refractory member") is arranged in a part of the inner bore portion. A material for the gas-permeable refractory member 22G may be a commonly-used alumina-graphite based gas-permeable refractory material, or may be a material which is enhanced in porosity or permeability while maintaining the composition of the refractory product of the present invention. Instead of the immersion nozzle as in the example illustrated in FIG. 1C, the supply of gas into molten steel may be performed from any other suitable position in a molten steel flow path, such as the upper nozzle or the sliding nozzle located above the immersion nozzle FIG. 2A illustrates an example of an immersion nozzle (casting nozzle) which comprises: a first refractory layer arranged to define a part of a surface to be subjected to contact with molten steel (in this example, an inner bore surface), wherein the first refractory layer is composed of the refractory product 20 of the present invention; and a second refractory layer arranged on the side of a back surface of the first refractory layer, wherein the second refractory layer has a composition different from that of the first refractory layer 20 (a powder line material 21 or a nozzle body material 22), and wherein the first and second refractory layers are integrated together in direct contact relation to each other.

FIG. 2B illustrates one example in which the refractory product 20 of the present invention is used to define an inner surface and an outer surface of a discharge port as a part of the surface to be subjected to a contact with molten steel, in addition to the part illustrated in FIG. 2A, wherein a partial region of the nozzle just above the discharge port and the entire region of the nozzle below the discharge port are composed of the refractory product 20 of the present invention. Alternatively, only a surface of a region of the nozzle just above and just below the discharge port to be subjected to a contact with molten steel may be composed of the refractory product 20 of the present invention, and an inside thereof may be made, for example, of an alumina-graphite refractory material.

FIG. 2C illustrates an example in which the immersion nozzle in FIG. 2B is modified to have a function of injecting gas from the inner bore portion (inner bore surface) into molten steel. That is, a gas-permeable refractory member 22S is arranged in a part of the inner bore portion of the immersion nozzle, and gas is injected into molten steel through the gas-permeable refractory member 22S. The reference code 22S in FIG. 2C indicates a space serving as a gas passage and a gas accumulator.

A specific example of the second refractory layer (the powder line material 21 and the nozzle body material 22) illustrated in FIGS. 2A to 2C may be at least one type of refractory member which comprises refractory particles made of one or more selected from the group consisting of $Al_2O_3$, $SiO_2$, MgO and $ZrO_2$ or a compound thereof, and carbon, or may be a refractory member which is composed of the refractory product of the present invention but is different from the first refractory layer arranged to define a part or an entirety of a surface to be subjected to contact with molten steel, in terms of a composition, etc. For example, the difference in the latter may include a difference in the ratio CaO/MgO, a difference in the carbon content, a difference in the presence/absence or amount of the component of $SiO_2$, $ZrO_2$, SiC or metal Si, and a difference in particle size distribution of a refractory raw material. The casting nozzle with this structure is effective in the case where high corrosion resistance to powder in a mold is required. In other words, this casting nozzle is intended to achieve an improvement on a durability determinant factor other than alumina adhesion.

In production of the above double-layer casting nozzle, based on the above production method, after partitioning a raw material mixture filling space in a target region inside a CIP molding mold, at a position radially distant from the contact surface with molten steel by a predetermined thickness, one sub-space on the side of the contact surface may be filled with a raw material mixture for the refractory product of the present invention, while allowing the other sub-space on a back side thereof to be filled with a raw material mixtures, for example, for the at least one refractory member which comprises refractory particles made of one or more selected from the group consisting of $Al_2O_3$, $SiO_2$, MgO and $ZrO_2$ or a compound thereof, and carbon. Then, after removing a jig used for the partition, such as a partition plate, in advance of molding, the mixtures may be subjected to pressure forming.

FIG. 3A is another example of an immersion nozzle (casting nozzle) having three layers for fundamentally the same purpose as the examples illustrated in FIGS. 2A to 2C, wherein, between a first refractory layer composed of the refractory product 20 of the present invention, and a second refractory layer (a powder line material 21 and a nozzle body material 22) arranged on the side of a back surface of the first refractory layer, a sheet-shaped third layer 23 containing carbon in an amount of 90 mass % or more and having a thickness of 0.1 to 3 mm is arranged. A specific example of the second refractory layer may be the same as that in the example illustrated in FIGS. 2A to 2C.

FIG. 3B illustrates one example in which the refractory product 20 of the present invention is used to define an inner surface and an outer surface of a discharge port as a part of the surface to be subjected to a contact with molten steel, in addition to the part illustrated in FIG. 3A, wherein a partial region of the nozzle just above the discharge port and the entire region of the nozzle below the discharge port are composed of the refractory product 20 of the present invention. Alternatively, only a surface of a region of the nozzle just above and just below the discharge port to be subjected to a contact with molten steel may be composed of the refractory product 20 of the present invention, and an inside thereof may be made, for example, of an alumina-graphite refractory material.

FIG. 3C illustrates an example in which the immersion nozzle in FIG. 3B is modified to have a function of injecting gas from a part of an inner bore portion (inner wall surface) thereof into molten steel.

The carbonaceous, sheet-shaped third layer 23 seldom reacts with an oxide component of the first and second refractory layers constituting the casting nozzle. Thus, even in casting conditions, for example, a particularly long casting time or a particularly high casting temperature, under which there is a high risk that a low-melting-point substance is formed through a reaction between the first refractory layer composed of the refractory product of the present invention, and the second refractory layer made, for example, of either one of an $Al_2O_3$—C based refractory material, an $Al_2O_3$—$SiO_2$ based refractory material, a $ZrO_2$—C based refractory material, a spinel-C based refractory material and a MgO-C based refractory material, and thus it becomes impossible to maintain a structure as a casting nozzle during casting operation, the third layer functions to avoid such a risk.

Because of low reactivity with components of the refractory product, the third layer can also function to relax stress generated between the first and second refractory layers due to thermal expansion difference therebetween, thereby further enhancing the effect of suppressing braking due to thermal shock and thermal expansion difference.

The carbon content of the carbonaceous, sheet-shaped third layer is set to 90 mass % or more. This is because, if the content of components other than carbon is greater than 10 mass %, the third layer becomes more likely to react with the first or second refractory layer, so that a low-melting-point substance is produced, causing difficulty in maintaining the structure of the triple-layer casting nozzle, or a stress relaxation capability is lowered, causing deterioration in thermal shock resistance.

The thickness of the carbonaceous, sheet-shaped third layer is set to 0.1 mm or more. This is because, if the thickness is less than 0.1 mm, the third layer is more likely to suffer from mechanical damage, in view of a typical strength level of a commercially-available carbonaceous sheet having such a thickness. On the other hand, if the thickness is greater than 3 mm, it becomes difficult to endure a thickness of the first refractory layer (inner bore-defining refractory member) or the second refractory layer (nozzle body refractory member), which causes problems, such as difficulty in ensuring a thickness of the first or second refractory layer in view of durability, and peeling (spalling) of the first refractory layer (inner bore-defining refractory member) during casting. An optimal thickness is in the range of 0.4 to 1.0 mm.

In production of the above triple-layer casting nozzle where the carbonaceous, sheet-shaped third layer is arranged between the first and second refractory layers, based on the above production method, after partitioning a raw material mixture filling space in a target region inside a CIP molding mold, in the same manner as that in the double-layer casting nozzle, by using a carbonaceous sheet as a jig for the partition, one sub-space on the side of the contact surface may be filled with a raw material mixture for the refractory product of the present invention, while allowing the other sub-space on a back side thereof to be filled with a raw material mixture, for example, for at least one type of refractory product which comprises refractory particles made of one or more selected from the group consisting of $Al_2O_3$, $SiO_2$, MgO and $ZrO_2$ or a compound thereof, and carbon. Then, the mixtures may be subjected to pressure forming, while leaving the carbonaceous sheet therebetween.

In the present invention, instead of the sheet-shaped carbonaceous layer arranged between the first and second refractory layers of the triple-layer casting nozzle, a layer mutually bonding the first and second refractory layers (hereinafter referred to simply as "mortar layer") may be arranged at a position of the sheet-shaped carbonaceous layer between the first and second refractory layers. This is an example in which a plurality of members each prepared as a sort of component on a layer-by-layer basis are bonded together as a assembled structure by a layer having a bonding function, such as mortar, i.e., a single body making up a layer of the refractory product 20 of the present invention described in any one of the sections (1) to (4) (this single body will hereinafter be referred to as "sleeve layer"), and a single body making up a nozzle body portion other than the sleeve layer, are prepared by separate processes, respectively, and then the layer of the refractory product 20 (sleeve layer) is installed into the single body making up the nozzle body to form one casting nozzle.

This structure is particularly effective, for example, in a situation where a level of adhesion of molten steel-derived component, such as alumina, onto an inner bore surface of a casting nozzle varies due to a change in composition of molten steel during casting operation. That is, a level of adhesion of alumina or the like under individual casting conditions is minimized, so that it becomes possible to optimize the composition of the refractory product 20 of the present invention in conformity to the conditions and facilitate obtaining a casting nozzle having a layer of the optimized refractory product 20 of the present invention.

In order to avoid fusion, sintering or the like between the first refractory layer composed of the refractory product 20 of the present invention and the second refractory layer making up the nozzle body, the mortar layer contains an acid oxide, such as $Al_2O_3$ or $SiO_2$, preferably in an amount of 20 mass % or less. The remainder may be a non-oxide, such as MgO, CaO, $ZrO_2$ or SiC, and/or a metal, such as Al—Mg. As long as the mortar layer has a thickness of about 0.1 to 3 mm, fusion, sintering or the like can be avoided. However, considering a possibility that bonding failure is likely to occur during charging of mortar, it is desirable to set the thickness to 1 mm or more. If the thickness is greater than 3 mm, the sleeve layer is more likely to be peeled due to degradation of the mortar itself during casting, resulting in mixing of a peeled piece into slab.

The immersion nozzle having the above structure may have a function of injecting gas into an inner bore by providing a layer composed of a gas-injecting refractory member, in a part of an inner bore portion. The above structures may be appropriately selected depending on individual casting conditions and required (demand) characteristics.

Figure 2:
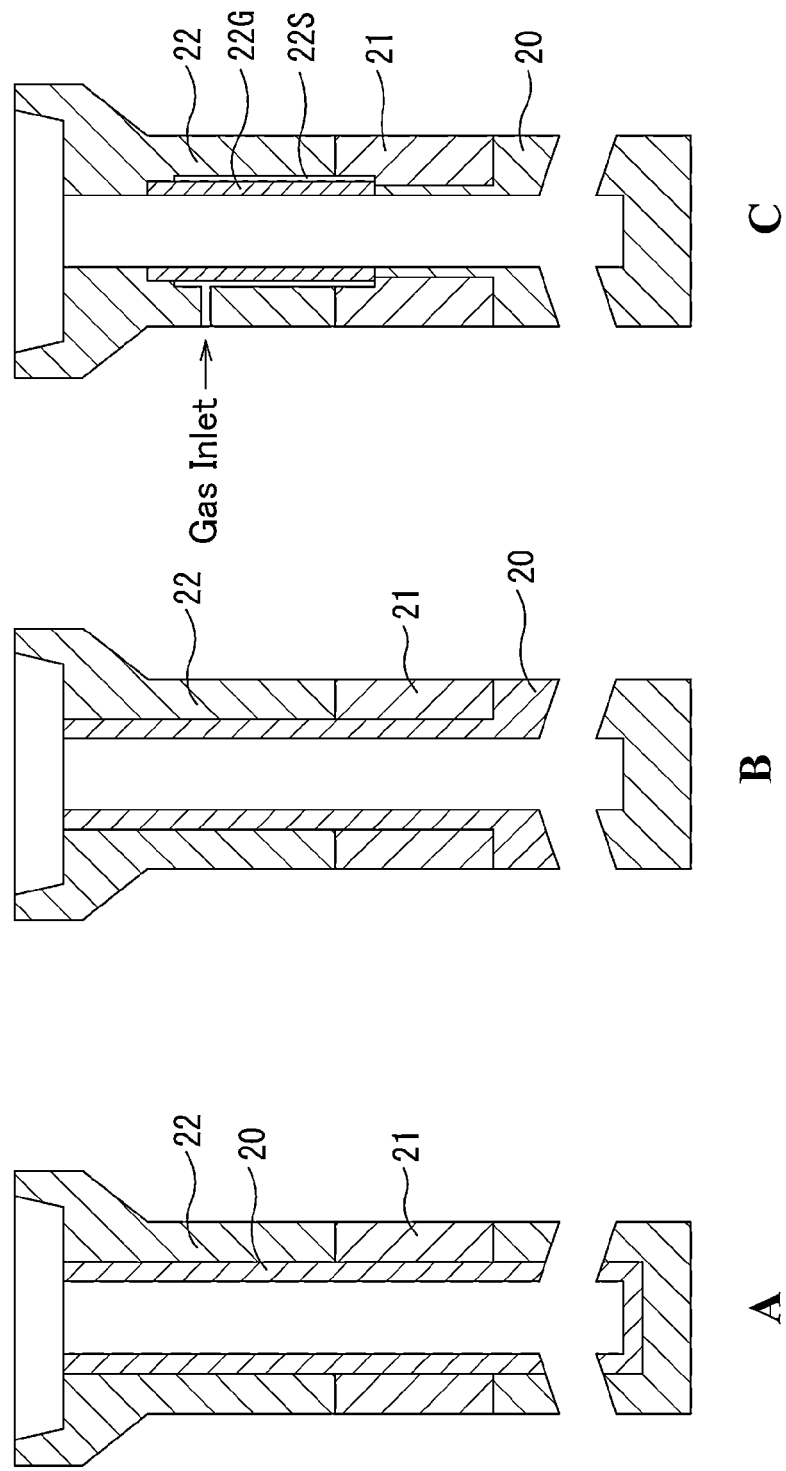
Figure 3:
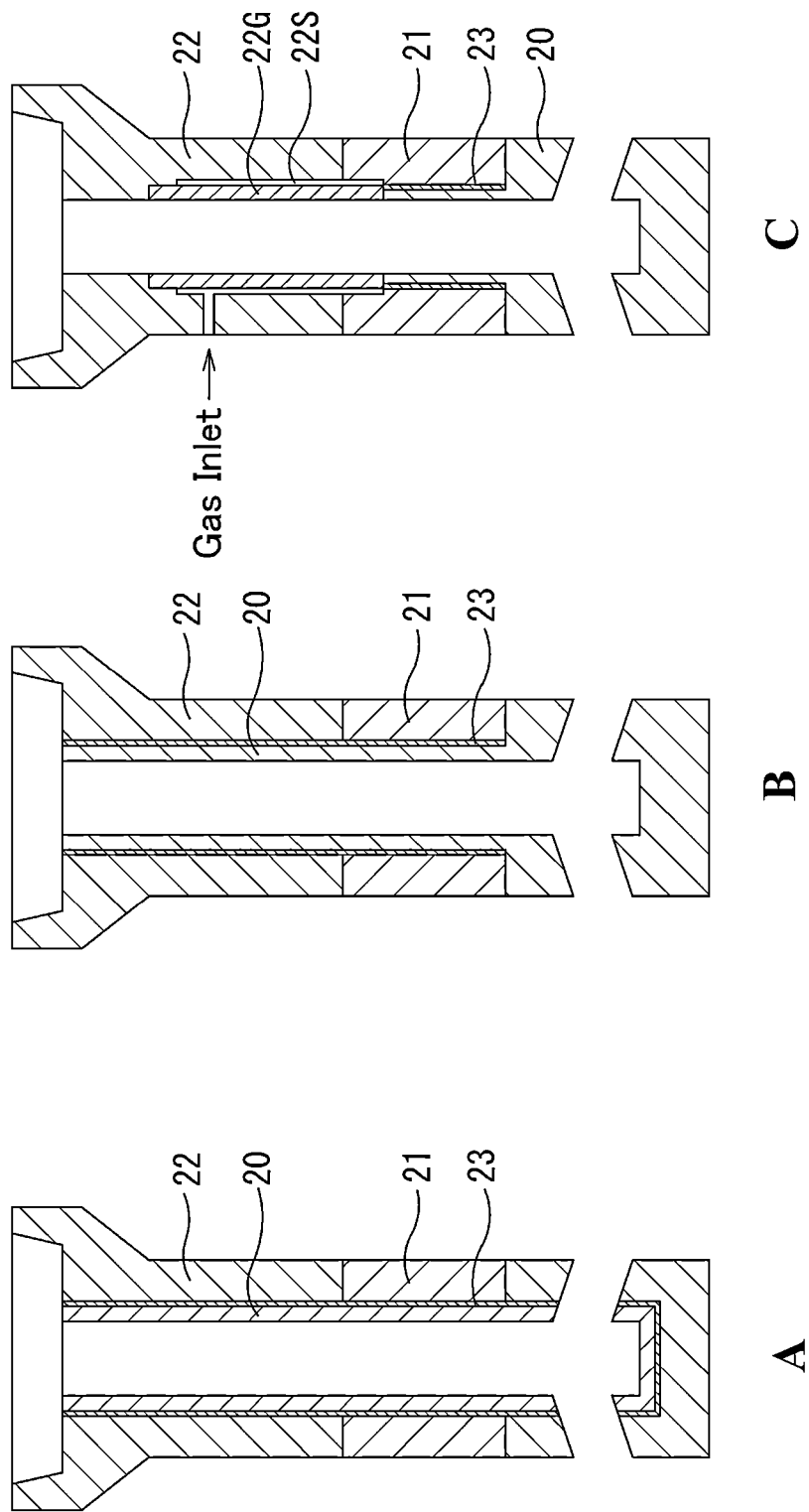
Figure 4:
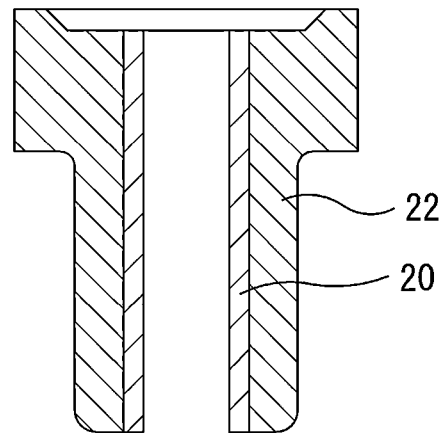
FIG. 4 illustrates one type of lower nozzle (casting nozzle) using the refractory product of the present invention.
Figure 5:
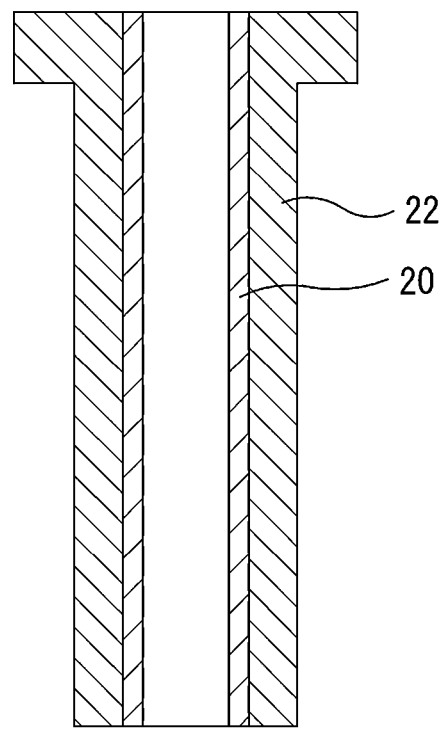
FIG. 5 illustrates one type of long nozzle (casting nozzle) using the refractory product of the present invention.
Figure 6:
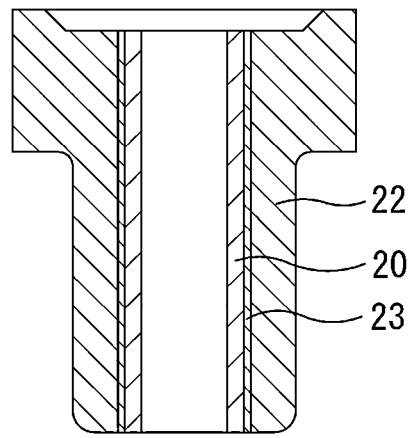
FIG. 6 illustrates another type of lower nozzle (casting nozzle) using the refractory product of the present invention.
Figure 7:
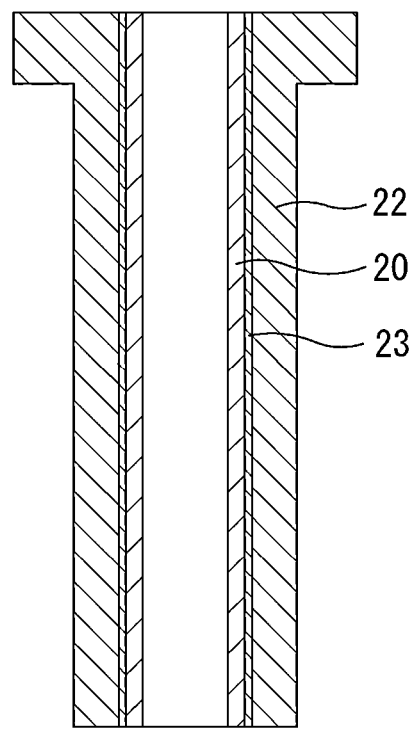
FIG. 7 illustrates another type of long nozzle (casting nozzle) using the refractory product of the present invention.

FIG. 4 and FIG. 5 illustrate, respectively, one example of a lower nozzle, and one example of a long nozzle, wherein each of the nozzles comprises: a first refractory layer arranged to define a part or an entirety of a surface to be subjected to contact with molten steel, wherein the first refractory layer is composed of the refractory product 20 of the present invention; and a second refractory layer (a nozzle body material 22) arranged on the side of a back surface of the first refractory layer, wherein the second refractory layer has a composition different from that of the first refractory layer 20, and wherein the first and second refractory layers are integrated together in direct contact relation to each other, as with the nozzle illustrated in FIG. 2. FIG. 6 and FIG. 7 illustrate, respectively, one example of a lower nozzle, and one example of a long nozzle, wherein, between a first refractory layer composed of the refractory product 20 of the present invention, and a second refractory layer (a nozzle body material 22) arranged on the side of a back surface of the first refractory layer, a sheet-shaped third layer 23 containing carbon in an amount of 90 mass % or more and having a thickness of 0.1 to 3 mm is arranged, as with the nozzle illustrated in FIG. 3.

EXAMPLES

Example A

In this Example, an influence of an amount of the metal oxide in the chemical composition of the refractory product was checked.

A phenolic resin was added as a binder to a refractory raw material (refractory particles) having a composition illustrated in Table 1, and the resulting mixture was kneaded. Then, the kneaded mixture was adjusted to have appropriate formability. The mixture was shaped by a CIP process, and the shaped mixture was subjected to a hardening-drying treatment at up to 300° C. and then to a heat treatment in a non-oxidizing atmosphere at 1200° C. A part of the resulting refractory products were further subjected to a carbonation treatment in a $CO_2$ gas atmosphere at 600° C. for 60 minutes. In this Example, burnt dolomite clinker particles were used as the CaO and/or MgO-containing refractory particles, and boron oxide ($B_2O_3$) was used as the metal oxide for forming the film in the refractory product of the present invention.

The obtained refractory product was subjected to analysis for chemical composition, observation for microstructure, and an evaluation test. The chemical composition was analyzed after heating the sample in a non-oxidizing atmosphere at 1000° C. As to the observation for microstructure, the microstructure of the refractory product was observed through a microscope after it was impregnated with a resin and then mirror-finished by mechanical polishing.

The evaluation of the refractory product was performed by an in-molten steel rotation test and a slaking resistance test. The in-molten steel rotation test is a method capable of evaluating alumina adhesion-resistance essentially required for the refractory product of the present invention, together with erosion/corrosion resistance.

As used in the following Examples, the term "erosion/corrosion" or "wear" is used as a concept generally expressing a state in which a sample after the test is dimensionally reduced, irrespective of whether a damaging mechanism is a loss caused by a chemical reaction (corrosion due to lowering in meting point, etc.) or a loss caused by a mechanical abrasive action, such as abrasion (so-called "erosion").

Figure 8:
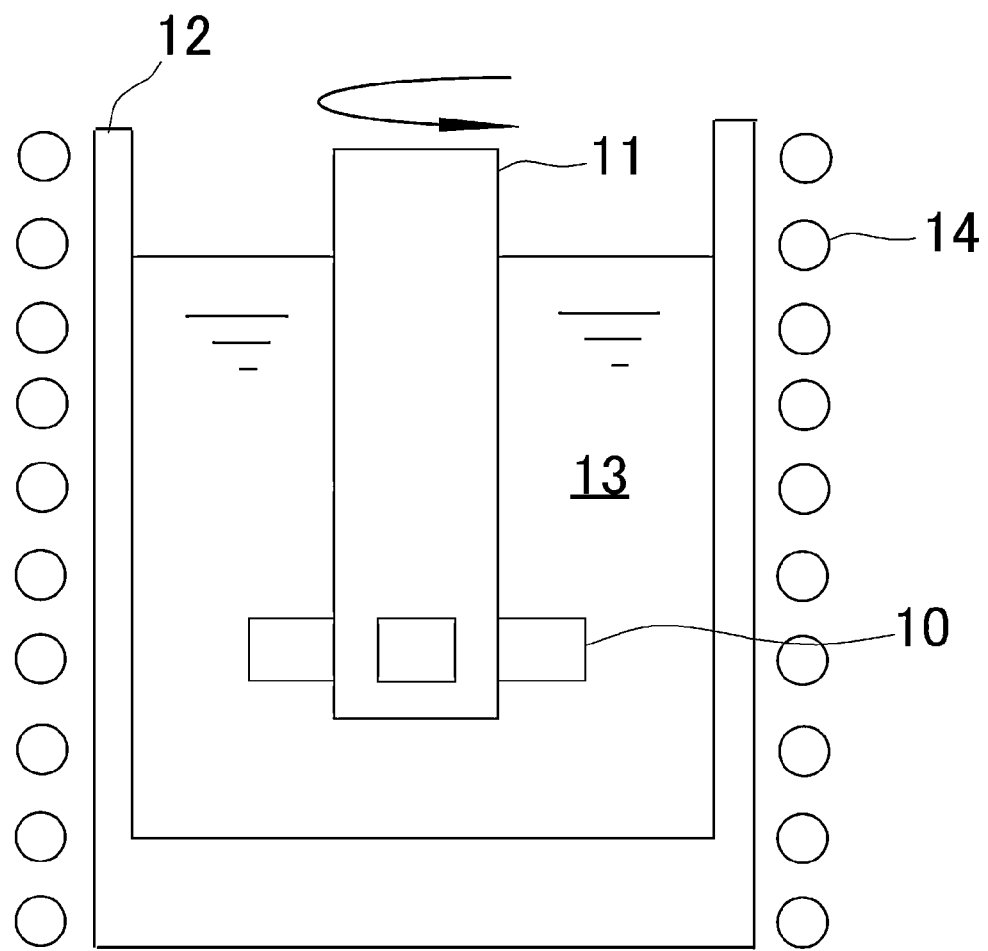
FIG. 8 illustrates an outline of an in-molten steel rotation test method.
Figure 9:
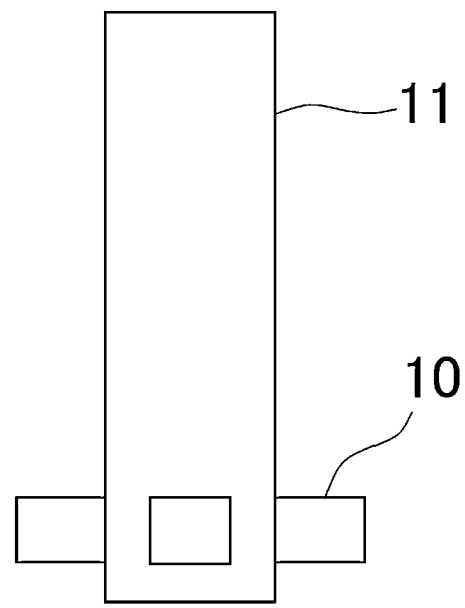
Figure 9:
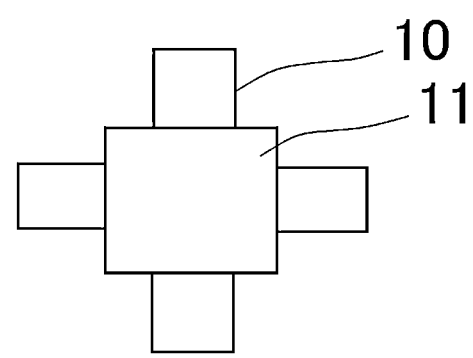

FIG. 8 schematically illustrates an in-molten steel rotation test method, and FIG. 9 illustrates a test piece for the in-molten steel rotation test, wherein FIG. 9A is a schematic front view, and FIG. 9B is a schematic top plan view.

In the in-molten steel rotation test, a test piece 10 held at a lower portion of a holder 11 is immersed in molten steel 13 in a crucible 12. The test piece 10 is formed in a rectangular parallelepiped shape and provided in a number of four, and the holder 11 is formed in a square pillar shape, wherein the four test pieces 10 are fixed, respectively, to four side surfaces of the lower portion of the holder 11. The test pieces 10 are inserted, respectively, into four recesses provided in the square pillar-shaped holder 11, in such a manner that they can be pulled out therefrom after completion of the test. An upper portion of the holder 11 is connected to and held by a non-illustrated rotary shaft in a rotatable manner about a longitudinal axis thereof as a rotation axis.

The holder 11 is made of a zirconia-carbon based refractory material and formed to have a square shape with a side of 40 mm, in horizontal cross-section, and a longitudinal length of 160 mm. Each of the test pieces 10 has a portion exposed from the holder 11. The exposed portion has a heightwise length of 20 mm, a widthwise length of 20 mm and a protruding length of 25 mm. The test piece 10 is attached to the holder at a position located upwardly away from a lower end thereof by 10 mm. The crucible 12 is made of a refractory material and formed in a cylindrical shape having an inner diameter of 130 mm and a depth of 190 mm. The holder 11 is immersed at a depth of 50 mm or more. The crucible 12 is placed inside a high-frequency induction furnace 14. Although not illustrated, an upper surface of the crucible can be closed by a cover.

In the in-molten steel rotation test, after pre-heating the test pieces 10 by holding them just above the molten steel 13 for 5 minutes, the test pieces 10 are immersed in the molten steel 13 (low-carbon aluminum-killed steel), and rotated at an average circumferential velocity of 1 msec at an outermost periphery of each of the test pieces 10. During the test, an oxygen concentration of the molten steel 13 is kept in the range of 10 to 50 ppm by adding aluminum to the molten steel 13, and the temperature of the molten steel 13 is kept in the range of 1550 to 1600° C. After three hours, the test pieces 10 are pulled up, and, an adhesion/wear speed ($\mu$m/min) is measured.

Figure 10:
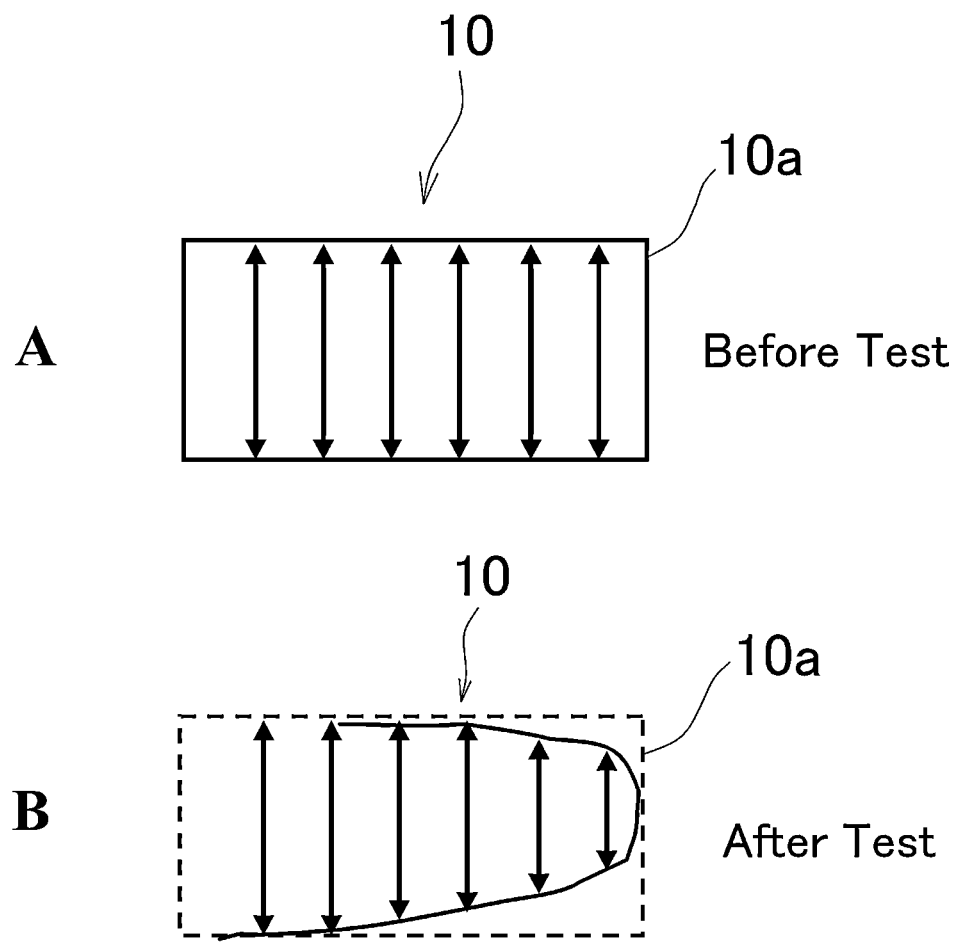
FIGS. 10A and 10B illustrate an outline of an adhesion/wear speed measurement method in the in-molten steel rotation test.

The measurement of the adhesion/wear speed is performed as follows. As shown in FIG. 10B, each of the test pieces 10 after completion of the test is detached from the holder, and cut along a horizontal plane with respect to the rotation axis. Then, respective lengths at 6 positions of the cut surface are measured at 3 mm pitch in a direction from an edge 10a of the test piece 10 toward the rotation axis, and averaged. Respective lengths at the same positions of the test piece 10 before the test are also measured and averaged, as illustrated in FIG. 10A. Then, the average value (mm) after the test is subtracted from the average value (mm) before the test, and the obtained value is divided by a test time of 180 minutes, to obtain the adhesion/wear speed ($\mu$m/min) The "−" indicates a tendency to exhibit "wear", and the "+" indicates a tendency to exhibit "adhesion".

The slaking resistance test was performed using a thermo-hygrostat. A test piece was formed in a shape having a size of 20×20×80 mm. This test piece was held at 40° C. in air having a relative humidity of 90%, and a change in weight before and after the holding was measured. Further, the number of days until a weight change index [(weight of the test piece after the holding/weight of the test piece before the holding)×100] becomes greater than 101.5, was measured. As to a criterion for practicability, a test piece durable for 3 days or more (the above number of days is 3 or more) was determined as "practicable". A test piece durable for 31 days or more was evaluated as "excellent". In this case, it was considered that a water impermeable film is almost perfectly formed. This durability is at a previously unachievable level.

A result of the evaluation is illustrated in Table 1.

TABLE 1

|  |  |  | Comparative sample 1 | Comparative sample 2 | Inventive sample 1 | Inventive sample 2 | Inventive sample 3 | Inventive sample 4 | Inventive sample 5 | Inventive sample 6 |
|---|---|---|---|---|---|---|---|---|---|---|
| Refractory raw material | Burnt dolomite clinker | greater than 0.1 mm to 1 mm (mass %) | 50 | 50 | 50 | 50 | 50 | 50 | 50 | 50 |
|  | Burnt dolomite clinker | −0.1 mm (mass %) | 10 | 10 | 10 | 10 | 10 | 10 | 10 | 10 |

TABLE 1-continued

|  |  |  |  |  |  |  |  |  |  |  |
|---|---|---|---|---|---|---|---|---|---|---|
|  | Magnesia clinker | −0.15 mm (mass %) | 20 | 20 | 20 | 20 | 20 | 20 | 20 | 20 |
|  | Graphite | −0.5 mm (mass %) | 20 | 20 | 20 | 20 | 20 | 20 | 20 | 20 |
|  | Boron oxide (*) | −0.1 mm | 0 | 0 | 0.1 | 0.5 | 1 | 1 | 1.6 | 1.6 |
| Binder | Phenolic resin (*) | content of solid resin (fixed carbon 50%) | 5 | 5 | 5 | 5 | 5 | 5 | 5 | 5 |
| Chemical composition | Content of carbon (mass %) |  | 22.0 | 22.0 | 21.9 | 21.8 | 21.7 | 21.7 | 21.6 | 21.6 |
|  | Total content of one or more of the oxides (*) (mass %) |  | 0.0 | 0.0 | 0.1 | 0.5 | 1.0 | 1.0 | 1.5 | 1.5 |
|  | Total content of (CaO + MgO) (mass %) |  | 78 | 78 | 78 | 78 | 77 | 77 | 77 | 77 |
|  | Mass ratio CaO/MgO |  | 0.8 | 0.8 | 0.8 | 0.8 | 0.8 | 0.8 | 0.8 | 0.8 |
|  | Carbonation treatment | Implementation of carbonation treatment | No | Yes | No | No | No | Yes | No | Yes |
|  |  | $CaCO_3$ content (mass %) | 0 | 2.1 | 0 | 0 | 0 | 1.2 | 0 | 1.0 |
| State of microstructure | State of compound of CaO with one or more of the oxides (*) in each surface of burnt dolomite clinker particles (after burning in non-oxidizing atmosphere at 1200° C.) |  | absence | absence | partial film | partial film | capsular film | capsular film | capsular film | capsular film |
|  |  | Thickness range (μm) | 0 | 0 | 0.1~0.5 | 0.5~1.0 | 1~2 | 1~2 | 2~5 | 2~5 |
| Evaluation result | (1) In-molten steel rotation test [S] <40 ppm | Criteria; Excellent (double circle): <±5, Good (○): <±20 | −5 | −5 | −7 | −8 | −12 | −11 | −15 | −13 |
|  | Adhesion (+)/wear (−) speed (μm/min) | Acceptable (Δ): ±21 to ±35, Unacceptable (×): >±36 | ⊚ | ⊚ | ○ | ○ | ○ | ○ | ○ | ○ |
|  | (2) Slaking resistance 40° C., 90 RH % (in air) | Criteria; Excellent (double circle): >31 days, Good (○): 15 to 30 days | 1 | 2 | 3 | 8 | 15 | 70 | 20 | 100 |
|  | The number of days until weight change index reaches 101.5 | Acceptable (Δ): 3 to 14 days, Unacceptable (×): <2 days | × | × | Δ | Δ | ○ | ⊚ | ○ | ⊚ |
| ○: Excellent, Δ: Good, ×: Bad |  |  | × | × | Δ | Δ | ○ | ○ | ○ | ○ |

|  |  |  | Inventive sample 7 | Inventive sample 8 | Inventive sample 9 | Inventive sample 10 | Comparative sample 3 | Comparative sample 4 |
|---|---|---|---|---|---|---|---|---|
| Refractory raw material | Burnt dolomite clinker | greater than 0.1 mm to 1 mm (mass %) | 50 | 50 | 50 | 50 | 50 | 50 |
|  | Burnt dolomite clinker | −0.1 mm (mass %) | 10 | 10 | 10 | 10 | 10 | 10 |
|  | Magnesia clinker | −0.15 mm (mass %) | 20 | 20 | 20 | 20 | 20 | 20 |
|  | Graphite | −0.5 mm (mass %) | 20 | 20 | 20 | 20 | 20 | 20 |
|  | Boron oxide (*) | −0.1 mm | 3.2 | 3.2 | 5.4 | 5.4 | 5.5 | 7.2 |
| Binder | Phenolic resin (*) | content of solid resin (fixed carbon 50%) | 5 | 5 | 5 | 5 | 5 | 6 |
| Chemical composition | Content of carbon (mass %) |  | 21.3 | 21.3 | 20.9 | 20.9 | 20.8 | 20.9 |
|  | Total content of one or more of the oxides (*) (mass %) |  | 3.0 | 3.0 | 5.0 | 5.0 | 5.1 | 6.5 |
|  | Total content of (CaO + MgO) (mass %) |  | 76 | 76 | 74 | 74 | 74 | 73 |
|  | Mass ratio CaO/MgO |  | 0.8 | 0.8 | 0.8 | 0.8 | 0.8 | 0.8 |
|  | Carbonation treatment | Implementation of carbonation treatment | No | Yes | No | Yes | No | No |
|  |  | $CaCO_3$ content (mass %) | 0 | 0.8 | 0 | 0.5 | 0 | 1 |
| State of microstructure | State of compound of CaO with one or more of the oxides (*) in each surface of burnt dolomite clinker particles (after burning in non-oxidizing atmosphere at 1200° C.) |  | capsular film | capsular film | capsular film | capsular film | capsular film | capsular film |
|  |  | Thickness range (μm) | 5~10 | 5~10 | 15~25 | 15~25 | >28 | >40 |

TABLE 1-continued

| Evaluation result | (1) In-molten steel rotation test [S] <40 ppm | Criteria; Excellent (double circle): <±5, Good (○): <±20 | −20 | −19 | −35 | −33 | −36 | −52 |
|---|---|---|---|---|---|---|---|---|
| | Adhesion (+)/wear (−) speed (μm/min) | Acceptable (Δ): ±21 to ±35, Unacceptable (×): >±36 | ○ | ○ | Δ | Δ | × | × |
| | (2) Slaking resistance 40° C., 90 RH % (in air) | Criteria; Excellent (double circle): >31 days, Good (○): 15 to 30 days | 25 | >120 | 30 | >120 | 25 | 10 |
| | The number of days until weight change index reaches 101.5 | Acceptable (Δ): 3 to 14 days, Unacceptable (×): <2 days | ○ | ◎ | ○ | ◎ | ○ | ○ |
| | ○: Excellent, Δ: Good, ×: Bad | | ○ | ○ | Δ | Δ | × | × |

(*) mass % to be added to 100 mass % of the refractory raw material mixture

Each of the comparative sample 1 and the comparative sample 2 is an example of a refractory product devoid of boron oxide, i.e., devoid of the film. In the comparative sample 2, as anti-slaking measures for a lime-containing refractory product, only the carbonation treatment was performed. In the refractory product devoid of the film, the slaking resistance is 2 days or less, i.e., does not reach an acceptable level, irrespective of whether or not the carbonation treatment is performed.

Each of the inventive samples 1 to 10 is an example of a refractory product containing boron oxide in an amount of 0.1 to 5.0 mass %, and having the film. They show that the slaking resistance is significantly enhanced by incorporating boron oxide. They also show that the slaking resistance becomes higher along with an increase in content of boron oxide.

On the other hand, in the comparative samples 3 and 4 where the content of boron oxide is greater than 5.0 mass %, although the evaluations of the slaking resistance and adhesion in the in-molten steel rotation test (alumina adhesion-resistance) are sufficient, the wear amount is increased to an extent beyond a practicable range, which is likely to cause a reduction in usable life due to wear of the refractory product.

Each of the inventive sample 4, the inventive sample 6, the inventive sample 8 and the inventive sample 10 is a refractory product obtained by subjecting a respective one of the inventive sample 3, the inventive sample 5, the inventive sample 7 and the inventive sample 9 to the carbonation treatment. In other words, each of the inventive samples 4, 6, 8 and 10 is an example of a refractory product having carbonate in addition the boron oxide-based film. Table 1 shows that any sample subjected to the carbonation treatment has significantly improved slaking resistance as compared to the samples having only the boron oxide-based film.

Example B

In Example B, the slaking resistance and other characteristics were checked for refractory products using vanadium oxide ($V_2O_5$), titanium oxide ($TiO_2$), diphosphate pentoxide ($P_2O_5$), silicon oxide ($SiO_2$) and borosilicate glass, as the metal oxide in the refractory product of the present invention. Further, an effect of using such metal oxides (including boron oxide ($B_2O_3$)) in combination was also checked. Each sample was prepared and evaluated, in the same manner as that in Example A.

A mixing ratio and a composition of refractory raw materials and a result of the evaluation are illustrated in Table 2.

TABLE 2

| | | | Inventive sample 6 | Inventive sample 11 | Inventive sample 12 | Inventive sample 13 | Inventive sample 14 | Inventive sample 15 | Inventive sample 16 | Inventive sample 17 | Inventive sample 18 |
|---|---|---|---|---|---|---|---|---|---|---|---|
| Refractory raw material | Burnt dolomite clinker | greater than 0.1 mm to 1 mm (mass %) | 50 | 50 | 50 | 50 | 50 | 50 | 50 | 50 | 50 |
| | Burnt dolomite clinker | −0.1 mm (mass %) | 10 | 10 | 10 | 10 | 10 | 10 | 10 | 10 | 10 |
| | Magnesia clinker | −0.15 mm (mass %) | 20 | 20 | 20 | 20 | 20 | 20 | 20 | 20 | 20 |
| | Graphite | −0.5 mm (mass %) | 20 | 20 | 20 | 20 | 20 | 20 | 20 | 20 | 20 |
| | Boron oxide (*) | −0.1 mm | 1.6 | | | | | | 1.0 | 1 | 0.5 |
| | Vanadium oxide (*) | −0.1 mm | | 1.6 | | | | | | | 0.5 |
| | Titanium oxide (*) | −0.1 mm | | | 1.6 | | | | | 0.6 | 0.6 |
| | Diphosphate pentoxide (*) | −0.1 mm | | | | 1.6 | | | | | |
| | Silicon oxide (*) | −0.1 mm | | | | | 1.6 | | 0.6 | | |
| | Borosilicate glass (*) $SiO_2 = 70, B_2O_3 = 25$ | −0.1 mm | | | | | | 1.6 | | | |
| Binder | Phenolic resin (*) | content of solid resin (fixed carbon 50%) | 5 | 5 | 5 | 5 | 5 | 5 | 5 | 5 | 5 |
| Chemical composition | Content of carbon (mass %) | | 21.6 | 21.6 | 21.6 | 21.6 | 21.6 | 21.6 | 21.6 | 21.6 | 21.6 |
| | Total content of one or more of the oxides (*) (mass %) | | 1.5 | 1.5 | 1.5 | 1.5 | 1.5 | 1.5 | 1.5 | 1.5 | 1.5 |
| | Total content of (CaO + MgO) (mass %) | | 77 | 77 | 77 | 77 | 77 | 77 | 77 | 77 | 77 |
| | Mass ratio CaO/MgO | | 0.8 | 0.8 | 0.8 | 0.8 | 0.8 | 0.8 | 0.8 | 0.8 | 0.8 |
| | Carbonation treatment | Implementation of carbonation treatment | Yes | Yes | Yes | Yes | Yes | Yes | Yes | Yes | Yes |

TABLE 2-continued

|  |  |  | Inventive sample 6 | Inventive sample 11 | Inventive sample 12 | Inventive sample 13 | Inventive sample 14 | Inventive sample 15 | Inventive sample 16 | Inventive sample 17 | Inventive sample 18 |
|---|---|---|---|---|---|---|---|---|---|---|---|
|  |  | $CaCO_3$ content (mass %) | 1.0 | 1.1 | 1.8 | 1.2 | 1.9 | 1.4 | 1.1 | 1.1 | 1.2 |
| State of microstructure | State of compound of CaO with one or more of the oxides (*) in each surface of burnt dolomite clinker particles (after burning in non-oxidizing atmosphere at 1200° C.) |  | capsular film | capsular film | partial film | capsular film | partial film | capsular film | capsular film | capsular film | capsular film |
|  |  | Thickness range (μm) | 2~5 | 1~2 | 1~2 | 3~6 | 1~2 | 1~6 | 2~5 | 0.8 | 1~2 |
| Evaluation result | (1) In-molten steel rotation test [S] <40 ppm | Criteria; Excellent (double circle): <±5, Good (○): <±20 | −13 | −8 | −2 | −13 | −14 | −13 | −11 | −5 | −7 |
|  | Adhesion (+)/wear (−) speed (μm/min) | Acceptable (Δ): ±21 to ±35, Unacceptable (×): >±36 | ○ | ○ | ◎ | ○ | ○ | ○ | ○ | ◎ | ○ |
|  | (2) Slaking resistance 40° C., 90 RH % (in air) | Criteria; Excellent (double circle): >31 days, Good (○): 15 to 30 days | 100 | 62 | 35 | 90 | 28 | 45 | 110 | 80 | 73 |
|  | The number of days until weight change index reaches 101.5 | Acceptable (Δ): 3 to 14 days, Unacceptable (×): <2 days | ◎ | ◎ | ◎ | ◎ | ○ | ◎ | ◎ | ◎ | ◎ |
| ○: Excellent, Δ: Good, ×: Bad |  |  | ○ | ○ |  |  |  |  |  |  |  |

(*) mass % to be added to 100 mass % of the refractory raw material mixture

The inventive sample containing $V_2O_5$, $TiO_2$, $P_2O_5$ or $SiO_2$, and the inventive example containing a borosilicate glass powder consisting primarily of $SiO_2$ and $B_2O_3$, could obtain the same significant effects on the slaking resistance, the alumina adhesion-resistance and the wear resistance as those of the sample containing $B_2O_3$. In cases where two or more of the metal oxides are used in combination, such as the inventive sample 16 containing a combination of $B_2O_3$ and $SiO_2$, the inventive sample 17 containing a combination of $B_2O_3$ and $TiO_2$, and the inventive sample 18 containing a combination of $B_2O_3$, $V_2O_5$ and $TiO_2$, the same significant effects on the slaking resistance, the alumina adhesion-resistance and the wear resistance as those of the sample containing $B_2O_3$ could also be obtained.

Table 2 shows that, among the five metal oxides: $B_2O_3$, $V_2O_5$, $TiO_2$, $P_2O_5$ and $SiO_2$, $B_2O_3$ exhibits the highest effect on the slaking resistance.

Example C

In Example C, influences of the content of carbon and the total content of CaO and MgO in the chemical composition of the refractory product were checked. Each refractory product was prepared and evaluated, in the same manner as that in Example A. As to the evaluation on the refractory product, a crack resistance test was performed in addition to the in-molten steel rotation test and the slaking resistance test.

In the crack resistance test, thermal shock was applied to the refractory product in such a manner that molten steel having a temperature of 1600° C. is poured into a cylindrical-shaped test piece having an inner diameter φ of 80 mm, an outer diameter φ of 110 mm and a length of 300 mm. The molten steel was poured after preheating each test piece at 1000° C. for a holding time of 1 hour. After the pouring, an external appearance of the test piece was observed, and the presence or absence of crack was checked by cutting the test piece in a horizontal direction at 50 mm pitch. A test piece having no crack was determined to be practicable.

A mixing ratio and a composition of refractory raw materials and a result of the evaluation are illustrated in Table 3.

TABLE 3

|  |  |  | Comparative sample 5 | Inventive sample 19 | Inventive sample 6 | Inventive sample 20 | Inventive sample 21 | Inventive sample 22 |
|---|---|---|---|---|---|---|---|---|
| Refractory raw material | Burnt dolomite clinker | greater than 0.1 mm to 1 mm (mass %) | 40.6 | 41.3 | 50.0 | 56.3 | 59.4 | 62.5 |
|  | Burnt dolomite clinker | −0.1 mm (mass %) | 8.1 | 8.3 | 10.0 | 11.3 | 11.9 | 12.5 |
|  | Magnesia clinker | −0.15 mm (mass %) | 16.3 | 16.5 | 20.0 | 22.5 | 23.8 | 25.0 |
|  | Graphite | −0.5 mm (mass %) | 35 | 33.9 | 20 | 10 | 5 | 0 |
|  | Boron oxide (*) | −0.1 mm | 1.6 | 1.6 | 1.6 | 1.6 | 1.6 | 1.6 |
| Binder | Phenolic resin (*) | content of solid resin (fixed carbon 50%) | 5 | 5 | 5 | 5 | 5 | 5 |
| Chemical composition | Content of carbon (mass %) |  | 36.0 | 35.0 | 21.6 | 12.0 | 7.2 | 2.4 |
|  | Total content of one or more of the oxides (*) (mass %) |  | 1.5 | 1.5 | 1.5 | 1.5 | 1.5 | 1.5 |
|  | Total content of (CaO + MgO) (mass %) |  | 62.4 | 63 | 77 | 86 | 91 | 96 |
|  | Mass ratio CaO/MgO |  | 0.8 | 0.8 | 0.8 | 0.8 | 0.8 | 0.8 |
|  | Carbonation treatment | Implementation of carbonation treatment | Yes | Yes | Yes | Yes | Yes | Yes |

TABLE 3-continued

|  |  |  |  |  |  |  |  |  |
|---|---|---|---|---|---|---|---|---|
|  |  | CaCO3 content (mass %) | 0.8 | 0.8 | 1.0 | 1.1 | 1.2 | 1.3 |
| State of micro-structure | State of compound of CaO with one or more of the oxides (*) in each surface of burnt dolomite clinker particles (after burning in non-oxidizing atmosphere at 1200° C.) |  | capsular film | capsular film | capsular film | capsular film | capsular film | capsular film |
|  |  | Thickness range (μm) | 2~5 | 2~5 | 2~5 | 2~5 | 2~5 | 2~5 |
| Evaluation result | (1) In-molten steel rotation test [S] <40 ppm Adhesion (+)/wear (−) speed (μm/min) | Criteria; Excellent (double circle): <±5, Good (○): <±20 Acceptable (Δ): ±21 to ±35, Unacceptable (×): >±36 | −40 × | −35 Δ | −13 ○ | −8 ○ | −6 ○ | −4 ◎ |
|  | (2) Slaking resistance 40° C., 90 RH % (in air) The number of days until weight change index reaches 101.5 | Criteria; Excellent (double circle): >31 days, Good (○): 15 to 30 days Acceptable (Δ): 3 to 14 days, Unacceptable (×): <2 days | >120 ◎ | >120 ◎ | 100 ◎ | 88 ◎ | 80 ◎ | 78 ◎ |
|  | (3) Crack resistance, Molten metal (1600° C.) pouring test (preheating: 1000° C.) | Criteria; ○: No occurrence of crack, ×: Occurrence of crack | ○ | ○ | ○ | ○ | ○ | ○ |
| ◎: Excellent, ○: Good, Δ: Good, ×: Bad |  |  | × | Δ | ○ | ○ | ○ | ○ |

|  |  |  | Inventive sample 23 | Comparative sample 6 | Inventive sample 24 | Inventive sample 25 | Inventive sample 26 | Comparative sample 7 |
|---|---|---|---|---|---|---|---|---|
| Refractory raw material | Burnt dolomite clinker | greater than 0.1 mm to 1 mm (mass %) | 62.5 | 62.5 | 62.5 | 62.5 | 40.4 | 62.5 |
|  | Burnt dolomite clinker | −0.1 mm (mass %) | 12.5 | 12.5 | 12.5 | 12.5 | 8.1 | 12.5 |
|  | Magnesia clinker | −0.15 mm (mass %) | 25.0 | 25.0 | 25.0 | 25.0 | 16.2 | 25.0 |
|  | Graphite | −0.5 mm (mass %) | 0 | 0 | 0 | 0 | 35.3 | 0 |
|  | Boron oxide (*) | −0.1 mm | 1.6 | 0.08 | 0.1 | 0.52 | 5.4 | 1.6 |
| Binder | Phenolic resin (*) | content of solid resin (fixed carbon 50%) | 4 | 4 | 4 | 4 | 5 | 2 |
| Chemical composition | Content of carbon (mass %) |  | 2.0 | 2.0 | 2.0 | 2.0 | 35.0 | 1.0 |
|  | Total content of one or more of the oxides (*) (mass %) |  | 1.5 | 0.08 | 0.10 | 0.50 | 5.0 | 1.6 |
|  | Total content of (CaO + MgO) (mass %) |  | 96.5 | 98.0 | 97.9 | 97.5 | 60 | 97.5 |
|  | Mass ratio CaO/MgO |  | 0.8 | 0.8 | 0.8 | 0.8 | 0.8 | 0.8 |
| Carbonation treatment | Implementation of carbonation treatment |  | Yes | Yes | Yes | Yes | Yes | Yes |
|  |  | CaCO3 content (mass %) | 1.3 | 1.3 | 1.3 | 1.3 | 0.8 | 1.3 |
| State of micro-structure | State of compound of CaO with one or more of the oxides (*) in each surface of burnt dolomite clinker particles (after burning in non-oxidizing atmosphere at 1200° C.) |  | capsular film | partial film | capsular film | capsular film | capsular film | capsular film |
|  |  | Thickness range (μm) | 2~5 | <1 | 1-1.5 | 1.5-2 | 15~25 | 2~5 |
| Evaluation result | (1) In-molten steel rotation test [S] <40 ppm Adhesion (+)/wear (−) speed (μm/min) | Criteria; Excellent (double circle): <±5, Good (○): <±20 Acceptable (Δ): ±21 to ±35, Unacceptable (×): >±36 | −4 ◎ | −3 ◎ | −3 ◎ | −3 ◎ | −35 Δ | −4 ◎ |
|  | (2) Slaking resistance 40° C., 90 RH % (in air) The number of days until weight change index reaches 101.5 | Criteria; Excellent (double circle): >31 days, Good (○): 15 to 30 days Acceptable (Δ): 3 to 14 days, Unacceptable (×): <2 days | 79 ◎ | <2 × | 3 Δ | 8 Δ | >120 ◎ | 70 ◎ |
|  | (3) Crack resistance, Molten metal (1600° C.) pouring | ×: Occurrence of crack | ○ | × | ○ | ○ | ○ | × |

TABLE 3-continued test (preheating: 1000° C.)
○: Excellent, Δ: Good, x: Bad   ○   x   ○   ○   ○   x (*) mass % to be added to 100 mass % of the refractory raw material mixture In Example C, boron oxide was selected as a representative example from the group of boron oxide, vanadium oxide, titanium oxide, diphosphate pentoxide, silicon oxide and borosilicate glass, and the content of boron oxide was set to a certain value (1.5 mass %), an upper limit (5.0 mass %) and a lower limit (0.1 mass %). Then, the composition was designed to allow the remainder of the refractory product of the present invention, except a total content of carbon and boron oxide, to become equal to a total content of CaO and MgO, by changing the content of carbon.

Each of the inventive sample 6 and the inventive samples 19 to 26 in which the total content of CaO and MgO is in the range of 60 to 97.9 mass %, and the content of carbon is in the range of 2 to 35 mass %, is significant excellent in slaking resistance, and excellent in alumina adhesion/wear resistance in the in-molten steel rotation test, and the crack resistance. Table 3 shows that there is a tendency for wear in the in-molten steel rotation test to become larger along with an increase in the carbon content.

In the inventive sample 24 which contains carbon and boron oxide in their low limit amounts, with the remainder being CaO and MgO, the slaking resistance is significantly improved as compared to the comparative samples 1 and 2 illustrated in Table 1 as typical conventional compositions, although there is a tendency for the slaking resistance to become lower as compared to other inventive samples.

In the comparative sample 5 where the carbon content is 36 mass %, the index in in-molten steel rotation test is −40 which is beyond ±35 determined as a threshold for practicability, i.e., large wear occurs. In the comparative sample 7 where the carbon content is 1 mass %, longitudinal crack occurs, resulting in poor crack resistance. From the above results, it is proven that the carbon content should be in the range of 2 to 35 mass %. Similarly, it is proven that, in the inventive sample 26 where the boron oxide content is set to its upper limit of 5.0 mass %, and the carbon content is set to its upper limit of 35 mass %, excellent results can be obtained in all of the evaluation items.

Table 3 also shows that the total content of CaO and MgO as the remainder of the refractory product of the present invention, except the total amount of carbon, boron oxide, vanadium oxide, titanium oxide, diphosphate pentoxide, silicon oxide and borosilicate glass, should be in the range of 60 to 97.5 mass %.

Example D

In this Example, an influence of a mass ratio CaO/MgO in the chemical composition of the refractory product was checked. In Example D, the carbon content was fixed to 21.6 mass %, and the ratio CaO/MgO was changed. Each refractory product was prepared and evaluated, in the same manner as that in Example A.

A mixing ratio and a composition of refractory raw materials and a result of the evaluation are illustrated in Table 4.

TABLE 4

| | | | Comparative sample 8 | Inventive sample 27 | Inventive sample 28 | Inventive sample 6 | Inventive sample 29 | Inventive sample 30 | Inventive sample 31 | Comparative sample 9 |
|---|---|---|---|---|---|---|---|---|---|---|
| Refractory raw material | Burnt dolomite clinker | greater than 0.1 mm to 1 mm (mass %) | 64.2 | 66.7 | 58.3 | 50.0 | 33.3 | 16.7 | 8.3 | 4.2 |
| | Burnt dolomite clinker | −0.1 mm (mass %) | 12.8 | 13.3 | 11.7 | 10.0 | 6.7 | 3.3 | 1.7 | 0.8 |
| | Magnesia clinker | −0.15 mm (mass %) | | | 10.0 | 20.0 | 40.0 | 60.0 | 70.0 | 75.0 |
| | Calcia clinker | greater than 0.1 mm to 1 mm (mass %) | 3.0 | | | | | | | |
| | Graphite | −0.5 mm (mass %) | 20 | 20 | 20 | 20 | 20 | 20 | 20 | 20 |
| | Boron oxide (*) | −0.1 mm | 1.6 | 1.6 | 1.6 | 1.6 | 1.6 | 1.6 | 1.6 | 1.6 |
| Binder | Phenolic resin (*) | content of solid resin (fixed carbon 50%) | +5 | +5 | +5 | +5 | +5 | +5 | +5 | +5 |
| Chemical composition | Content of carbon (mass %) | | 21.6 | 21.6 | 21.6 | 21.6 | 21.6 | 21.6 | 21.6 | 21.6 |
| | Total content of one or more of the oxides (*) (mass %) | | 1.5 | 1.5 | 1.5 | 1.5 | 1.5 | 1.5 | 1.5 | 1.5 |
| | Total content of (CaO + MgO)(mass %) | | 77 | 77 | 77 | 77 | 77 | 77 | 77 | 77 |
| | Mass ratio CaO/MgO | | 1.6 | 1.5 | 1.1 | 0.8 | 0.4 | 0.2 | 0.1 | 0.04 |
| | Carbonation treatment | Implementation of carbonation treatment | Yes | Yes | Yes | Yes | Yes | Yes | Yes | Yes |
| | | $CaCO_3$ content (mass %) | 1.3 | 1.3 | 1.2 | 1.0 | 0.7 | 0.4 | 0.3 | 0.2 |
| State of microstructure | State of compound of CaO with one or more of the oxides (*) in each surface of burnt dolomite clinker particles (after burning in non-oxidizing atmosphere at 1200° C.) | | capsular film | capsular film | capsular film | capsular film | capsular film | capsular film | capsular film | capsular film |
| | | Thickness range (μm) | 2~5 | 2~5 | 2~5 | 2~5 | 2~5 | 2~5 | 2~5 | 2~5 |
| Evaluation result | (1) In-molten steel rotation test [S] <40 ppm | Criteria; Excellent (double circle): <±5, Good (○): <±20 | −36 | −32 | −20 | −13 | 4 | 22 | 35 | 50 |
| | Adhesion (+)/wear (−) speed (μm/min) | Acceptable (Δ): ±21 to ±35, Unacceptable (x): >±36 | x | Δ | ○ | ○ | ⊚ | Δ | Δ | x |

TABLE 4-continued

|  |  | Comparative sample 8 | Inventive sample 27 | Inventive sample 28 | Inventive sample 6 | Inventive sample 29 | Inventive sample 30 | Inventive sample 31 | Comparative sample 9 |
|---|---|---|---|---|---|---|---|---|---|
| (2) Slaking resistance 40° C., 90 RH % (in air) The number of days until weight change index reaches 101.5 | Criteria; Excellent (double circle): >31 days, Good (○): 15 to 30 days Acceptable (Δ): 3 to 14 days, Unacceptable (×): <2 days | 84 ◎ | 93 ◎ | 98 ◎ | 100 ◎ | >120 ◎ | >120 ◎ | >120 ◎ | >120 ◎ |
| (3) Crack resistance, Molten metal (1600° C.) pouring test (preheating: 1000° C.) | Criteria; ○: No occurrence of crack, ×: Occurrence of crack | ○ | ○ | ○ | ○ | ○ | ○ | ○ | × |
| ○: Excellent, Δ: Good, ×: Bad |  | × | Δ | ○ | ○ | ○ | Δ | Δ | × |

(*) mass % to be added to 100 mass % of the refractory raw material mixture

Table 4 shows that each of the inventive sample 6 and the inventive samples 27 to 31 where the ratio CaO/MgO is in the range of 0.1 to 1.5, is significantly excellent in the slaking resistance, and excellent in alumina adhesion/wear resistance in the in-molten steel rotation test, and the crack resistance.

In the comparative sample 8 where the ratio CaO/MgO is 1.6, the index in in-molten steel rotation test is −36 which is beyond ±35 determined as a threshold for practicability, i.e., large wear occurs. In the comparative sample 9 where the ratio CaO/MgO is 0.04, the index in in-molten steel rotation test is +50 which is beyond ±35 determined as a threshold for practicability, i.e., large wear occurs. Moreover, crack occurs, resulting in poor crack resistance. From the above results, it is proven that the ratio CaO/MgO should be in the range of 0.1 to 1.5.

Example E

In Example E, an influence of the content of $CaCO_3$ in the chemical composition of the refractory product was checked. A method of preparing refractory products was fundamentally the same as that in Example A. However, in Example E, a time of the carbonation treatment was variously changed to change the $CaCO_3$ content in the refractory product. Each refractory product obtained through the carbonation treatment was subjected to a degassing test, in addition to the in-molten steel rotation test and the slaking resistance test.

In the degassing test, under a condition that a cylindrical-shaped test piece having an inner diameter φ of 80 mm, an outer diameter φ of 110 mm and a length of 300 mm was immersed in molten steel maintained at 1600° C., a state of boiling at a level of the molten steel was observed. A test piece before immersion into molten steel was preheated at 900° C. for a holding time of 30 minutes, in conformity to an actual (preheating) condition, and then immersed. A test piece causing strong boiling was determined to be impracticable.

As to measurement of the $CaCO_3$ content, an amount of carbon dioxide gas generated during heating of a carbonation-treated sample (which has not been exposed to a temperature greater than a decomposition temperature of $CaCO_3$ (about 825° C.)) in a non-oxidizing atmosphere at 1000° C. was measured, and the $CaCO_3$ content was derived from the amount of generated carbon dioxide by calculation, because, if a sample which has undergone heating in a non-oxidizing atmosphere at 1000° C. is evaluated as in other components, $CaCO_3$ has already been decomposed. Alternatively, it is possible to employ a technique of allowing a sample contained in a closed container to react with hydrochloric acid, and deriving the $CaCO_3$ content from an amount of generated carbon dioxide by calculation.

A mixing ratio and a composition of refractory raw materials and a result of the evaluation are illustrated in Table 5.

TABLE 5

|  |  |  | Inventive sample 32 | Inventive sample 6 | Inventive sample 33 | Inventive sample 34 | Inventive sample 35 |
|---|---|---|---|---|---|---|---|
| Refractory raw material | Burnt dolomite clinker | greater than 0.1 mm to 1 mm (mass %) | 50.0 | 50.0 | 50.0 | 50.0 | 50.0 |
|  | Burnt dolomite clinker | −0.1 mm (mass %) | 10.0 | 10.0 | 10.0 | 10.0 | 10.0 |
|  | Magnesia clinker | −0.15 mm (mass %) | 20.0 | 20.0 | 20.0 | 20.0 | 20.0 |
|  | Graphite | −0.5 mm (mass %) | 20 | 20 | 20 | 20 | 20 |
|  | Boron oxide (*) | −0.1 mm (mass % to be added to 100 mass % of the refractory raw material mixture) | 1.6 | 1.6 | 1.6 | 1.6 | 1.6 |
| Binder | Phenolic resin (*) | content of solid resin (fixed carbon 50%) | +5 | +5 | +5 | +5 | +5 |
| Chemical composition | Content of carbon (mass %) |  | 21.6 | 21.6 | 21.6 | 21.6 | 21.6 |
|  | Total content of one or more of the oxides (*) (mass %) |  | 1.5 | 1.5 | 1.5 | 1.5 | 1.5 |
|  | Total content of (CaO + MgO) (mass %) |  | 77 | 77 | 77 | 77 | 77 |

TABLE 5-continued

|  |  |  | Inventive sample 32 | Inventive sample 6 | Inventive sample 33 | Inventive sample 34 | Inventive sample 35 |
|---|---|---|---|---|---|---|---|
|  | Mass ratio CaO/MgO |  | 0.8 | 0.8 | 0.8 | 0.8 | 0.8 |
|  | Carbonation treatment | Implementation of carbonation treatment (h) | 0.01 | 1 | 3 | 5 | 7 |
|  |  | CaCO3 content (mass %) | 0.1 | 1.0 | 2.0 | 2.4 | 2.5 |
| State of microstructure | State of compound of CaO with one or more of the oxides (*) in each surface of burnt dolomite clinker particles (after burning in non-oxidizing atmosphere at 1200° C.) |  | capsular film | capsular film | capsular film | capsular film | capsular film |
|  |  | Thickness range (μm) | 2~5 | 2~5 | 2~5 | 2~5 | 2~5 |
| Evaluation result | (1) In-molten steel rotation test [S] <40 ppm | Criteria; Excellent (double circle): <±5, Good (○): <±20 | −13 | −13 | −13 | −13 | −13 |
|  | Adhesion (+)/wear (−) speed (μm/min) | Acceptable (Δ): ± 21 to ±35, Unacceptable (×): >±36 | ○ | ○ | ○ | ○ | ○ |
|  | (2) Slaking resistance 40° C., 90 RH % (in air) | Criteria; Excellent (double circle): >31 days, Good (○): 15 to 30 days | 55 | 100 | 115 | >120 | >120 |
|  | The number of days until weight change index reaches 101.5 | Acceptable (Δ): 3 to 14 days, Unacceptable (×): <2 days | ◎ | ◎ | ◎ | ◎ | ◎ |
|  | (4) Degassing phenomenon Immersing test piece in molten metal (1600° C.) just after preheating at 900 °C. for 30 minutes Δ: Occurrence of boiling ○: No occurrence of boiling |  | ○ | ○ | ○ | ○ | Δ |
| ○: Excellent, Δ: Good, ×: Bad |  |  | ○ | ○ | ○ | ○ | ○ |

(*) mass % to be added to 100 mass % of the refractory raw material mixture

Each of the inventive sample 6 and the inventive samples 32 to 35 is an example of a refractory product in which an inorganic film of a compound of CaO with $B_2O_3$ is produced at a certain thickness, and then $CaCO_3$ is produced in each CaO surface by reaction. Table 5 shows that the slaking resistance is significantly improved as an increase in the $CaCO_3$ content. On the other hand, in the inventive sample 35, when it was immersed in molten steel maintained at 1600° C. after preheating at 900° C. for 30 minutes, a boiling phenomenon slightly occurred due to carbon dioxide gas generated from undecomposed $CaCO_3$. However, it is a practicable level although it is desirable to take some measure, such as an increase in preheating temperature.

Example F

In Example F, an effect of the presence of a void layer between each burnt dolomite clinker particle and a carbonaceous matrix was checked.

A thickness of a void layer around each coarse aggregate particle in a microstructure of a refractory product having a carbonaceous matrix was changed in terms of a ratio of a thickness of a void layer to be produced after a heat treatment (MS value (%)), by changing a thickness of a pretreatment layer on a raw material, so as to check an influence of the MS value on an amount of thermal expansion.

More specifically, in order to form a void layer between each burnt dolomite clinker particle and the carbonaceous matrix, a surface of the burnt dolomite clinker particle was preliminarily subjected to a hydration treatment at room temperature, and a time of the hydration treatment for the surface was adjusted to form a plurality of types of pretreatment layers (coating layers) each composed of hydroxide having a different thickness.

Using magnesia clinker, the same pretreatment was performed.

Each sample was prepared in the following manner.

A phenolic resin is added as a binder to a refractory raw material (refractory particles) according to a design of each of a plurality of types of compositions comprising various refractory raw materials with the hydrated layers having different thicknesses, and the kneaded. Then, the kneaded mixture is adjusted to have formability suitable for shaping, and subjected to shaping by a CIP process. The shaped mixture is subjected to a hardening/drying treatment at up to 300° C., and then subjected to a heat treatment in a non-oxidizing atmosphere at 1200° C. When a heating temperature becomes greater than a decomposition temperature during the heat treatment, an active, porous layer will be formed on each particle surface with a thickness in proportion to that of the hydrated layer. Subsequently, through reaction with $B_2O_3$, the porous layer is densified (a volume of the porous layer is shrunk as a result of densification), so that a void layer is formed around the particle surface.

Each of the inventive samples 36 to 38 is an example of a refractory product obtained by subjecting, to a hydration treatment, the inventive sample 21 containing boron oxide in an amount of 1.6 mass % and subjected to no hydration treatment. The void layer was formed in the above manner, and the MS value was measured by the aforementioned method.

An effect of the obtained MS value was evaluated by measuring a maximum heat expansion at up to 1500° C. through thermomechanical analysis (TMA), in addition to the in-molten steel rotation test and the slaking resistance test.

respectively, and the reference numerals 4, 5 and 6 indicate the carbonaceous matrix after the heat treatment, a void layer produced after the heat treatment, and a $B_2O_3$-based film produced after the heat treatment, respectively.

TABLE 6

|  |  |  | Comparative sample 10 | Inventive sample 21 | Inventive sample 36 | Inventive sample 37 | Inventive sample 38 |
|---|---|---|---|---|---|---|---|
| Refractory raw material | Burnt dolomite clinker (*2) | greater than 0.1 mm to 1 mm (mass %) | 59.4 | 59.4 | 59.4 | 59.4 | 59.4 |
|  | Burnt dolomite clinker (*2) | −0.1 mm (mass %) | 11.9 | 11.9 | 11.9 | 11.9 | 11.9 |
|  | Magnesia clinker (*2) | −0.15 mm (mass %) | 23.8 | 23.8 | 23.8 | 23.8 | 23.8 |
|  | Graphite | −0.5 mm (mass %) | 5 | 5 | 5 | 5 | 5 |
|  | Thickness of pretreatment layer on a raw material surface μm |  | 0 | 0 | 7 | 14 | 16 |
|  | Boron oxide (*) | −0.1 mm | 0 | 1.6 | 1.6 | 1.6 | 1.6 |
| Binder | Phenolic resin (*) | content of solid resin (fixed carbon 50%) | +5 | +5 | +5 | +5 | +5 |
| Chemical composition | Content of carbon (mass %) |  | 7.3 | 7.2 | 7.2 | 7.2 | 7.2 |
|  | Total content of one or more of the oxides (*) (mass %) |  | 0.0 | 1.5 | 1.5 | 1.5 | 1.5 |
|  | Total content of (CaO + MgO) (mass %) |  | 93 | 91 | 91 | 91 | 91 |
|  | Mass ratio CaO/MgO |  | 0.8 | 0.8 | 0.8 | 0.8 | 0.8 |
|  | Carbonation treatment | Implementation of carbonation treatment | Yes | Yes | Yes | Yes | Yes |
|  |  | CaCO3 content (mass %) | 1.2 | 1.2 | 1.2 | 1.2 | 1.2 |
| State of microstructure | State of compound of CaO with one or more of the oxides (*) in each surface of burnt dolomite clinker particles (after burning in non-oxidizing atmosphere at 1200° C.) |  | capsular film | capsular film | capsular film | capsular film | capsular film |
|  |  | Thickness range (μm) | 2-5 | 2-5 | 2-5 | 2-5 | 2-5 |
|  | Ratio of a void layer between a coarse particle and the carbonaceous matrix (MS value) |  | 0.01 | 0.1 | 1.0 | 2.8 | 3.0 |
| Evaluation result | (1) In-molten steel rotation test [S] <40 ppm | Criteria; Excellent (double circle): <±5, Good (○): <±20 | −4 | −6 | −18 | −32 | −35 |
|  | Adhesion (+)/wear (−) speed (μm/min) | Acceptable (Δ): ±21 to ±35, Unacceptable (×): >±36 | ◎ | ○ | ○ | Δ | Δ |
|  | (2) Slaking resistance 40° C., 90 RH % (in air) | Criteria; Excellent (double circle): >31 days, Good (○): 15 to 30 days | 1 | 80 | 100 | 95 | 80 |
|  | The number of days until weight change index reaches 101.5 | Acceptable (Δ): 3 to 14 days, Unacceptable (×): <2 days | × | ◎ | ◎ | ◎ | ◎ |
|  | (5) Maximum heat expansion at up to 1500° C. (%) |  | 1.3 | 1.1 | 0.4 | 0.3 | 0.3 |
| ○: Excellent, Δ: Good, ×: Bad |  |  | × | ○ | ○ | ○ | ○ |

(*) mass % to be added to 100 mass % of the refractory raw material mixture

Figure 11:
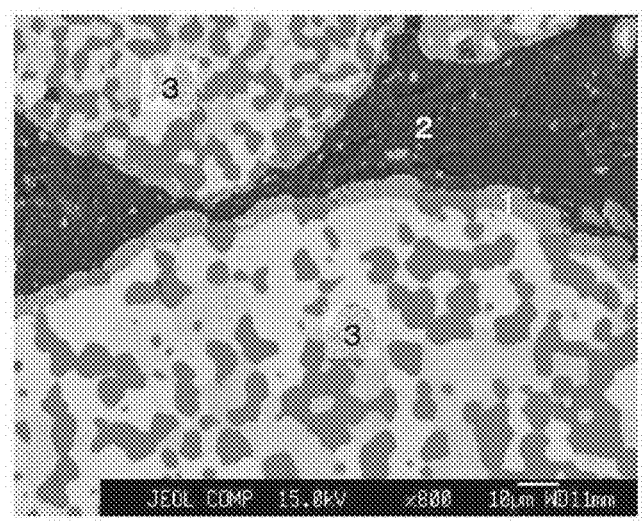
Figure 11:
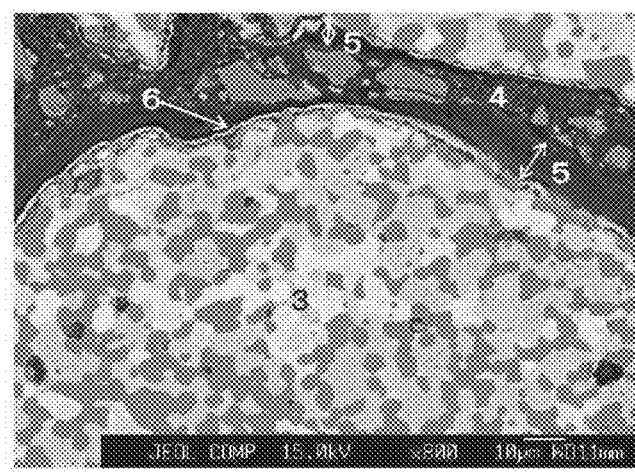

A mixing ratio and a composition of refractory raw materials and a result of the evaluation are illustrated in Table 6. Further, a photograph of a microstructure of the inventive sample 36 in Table 6 is shown in FIG. 11, wherein FIG. 11A illustrates the microstructure before the heat treatment, and FIG. 11B illustrates the microstructure after the heat treatment. In FIG. 11, the reference numerals 1, 2 and 3 indicate a coating layer (hydrated layer), a carbonaceous matrix before the heat treatment, and a burnt dolomite clinker particle, Table 6 shows that, in the comparative sample 10 having neither the void layer by the hydration treatment nor the boron oxide ($B_2O_3$)-based film, the slaking resistance is obviously extremely low (similar to the comparative sample 1), and the maximum heat expansion at up to 1500° C. is as high as 1.3% which is similar to that of a typical basic material.

Table 6 also shows that, in the inventive sample 21 with the boron oxide ($B_2O_3$)-based film, although it is devoid of the void layer by the hydration treatment, a void layer having an MS value of 0.1% greater than that of the comparative sample 10 is formed after the heat treatment, and thereby the maximum heat expansion at up to 1500° C. is lowered to 1.1%. That is, the presence of the $B_2O_3$-based film slightly contributes to lowering of thermal expansion.

On the other hand, in the inventive samples 36 to 38, the maximum heat expansion at up to 1500° C. is significantly lowered, wherein it is lowered along with an increase in the MS value, as see in Table 6. However, there is a tendency for the wear amount in the in-molten steel rotation test to increase along with an increase in the MS value. As seen in Table 6, at least until the MS value reaches 3.0%, the index in the in-molten steel rotation test is not beyond ±35 determined as a threshold for practicability, i.e., is in an allowable range.

The hydration-based void layer is formed around a particle surface to an extent causing no destruction of the particle. Thus, as to a thickness of the obtained void layer, about 3.0% in terms of the MS value is an upper limit for allowing the void layer to be stably formed.

In the case where a CaO and MgO-containing refractory product is used as an alumina adhesion-resistant material in such a manner that it is arranged to define a surface to be subjected to contact with molten steel, such as an inner bore of an immersion nozzle, and integrally formed with an outer peripheral-side refractory member having a composition different from that of the CaO and MgO-containing refractory product, such as $Al_2O_3$—C based or $ZrO_2$—C based refractory material, a problem such as braking due to thermal expansion difference is likely to occur when it is actually used while being heated up to a temperature level of molten steel. In this case, it is common practice to form a stress relaxation layer between the CaO and MgO-containing refractory product arranged to define a surface to be subjected to contact with molten steel, such as an inner bore of an immersion nozzle, and the outer peripheral-side refractory member having a composition different from that of the CaO and MgO-containing refractory product, such as $Al_2O_3$—C based or $ZrO_2$—C based refractory material, (irrespective of whether or not the stress relaxation layer is integrally formed with the refractory products).

When a thermal expansion during heating up to 1500° C. is measured, a maximum heat expansion of a typical $Al_2O_3$—C based or $ZrO_2$—C based refractory material is about +0.6%. If a refractory product having a thermal expansion equal to or less than that of such a typical $Al_2O_3$—C based or $ZrO_2$—C based refractory material to be arranged on an outer peripheral side is arranged on a side of the inner bore, breaking due to thermal expansion difference or the like can be avoided even in an casting nozzle (such as an immersion nozzle) having an integral structure.

In the refractory product of the present invention having a thermal expansion lowered by the void layer, the maximum heat expansion at up to 1500° C. is 0.4% or less. Thus, the refractory product of the present can be sufficiently used in a casting nozzle (such as an immersion nozzle) having an integral structure as mentioned above. That is, the low-expansion refractory product of the present invention allows a broad range of articles such as an immersion nozzle, different in material and/or structure, to be formed in a multi-layer structure.

The technique for the low-expansion refractory product of the present invention can be generally applied to refractory products for steel making and refractory products for continuous casting.

Example G

In Example G, an effect of the composition of the refractory product which contains one or more selected from the group consisting of SiC, $Si_3N_4$, $ZrO_2$ and metal Si, with remainder being the components described in the section (1) of [SOLUTION TO THE TECHNICAL PROBLEM] was checked.

Each sample was prepared and evaluated in the same manner as those in Examples A to F. However, in the in-molten steel rotation test, molten steel having an in-molten steel sulfur concentration adjusted in the range of 100 to 200 ppm and a molten-steel oxygen concentration adjusted to 20 ppm or less was used (In Example A to F, the sulfur concentration in molten steel and the molten-steel oxygen concentration in the in-molten steel rotation test are set to less than 50 ppm or less and 20 ppm or less, respectively).

A fundamental part to which one or more of SiC, $Si_3N_4$, $ZrO_2$ and metal Si are incorporated, i.e., the remainder of the composition of the refractory product of the present invention, except these components, consists of the composition of the inventive sample 6 (hereinafter referred to as "fundamental refractory composition"). One or more of SiC, $Si_3N_4$, $ZrO_2$ and metal Si were mixed with a raw material mixture of the fundamental refractory composition in such a manner that the content of each of the components with respect to 100 mass % of the fundamental refractory composition becomes equal to or less than the aforementioned upper limit, and each sample was prepared in the same manner as described above.

A mixing ratio, a chemical composition and a result of the evaluation are illustrated in Table 7.

TABLE 7

| | | | Inventive sample 39 | Inventive sample 40 | Comparative sample 11 | Inventive sample 41 | Inventive sample 42 | Inventive sample 43 | Inventive sample 44 | Inventive sample 45 | Inventive sample 46 |
|---|---|---|---|---|---|---|---|---|---|---|---|
| Refractory raw material | Burnt dolomite clinker | greater than 0.1 mm to 1 mm (mass %) | 50 | 50 | 50 | 50 | 50 | 50 | 50 | 50 | 50 |
| | Burnt dolomite clinker | −0.1 mm | 10 | 10 | 10 | 10 | 10 | 10 | 10 | 10 | 10 |
| | Magnesia clinker | −0.15 mm | 20 | 20 | 20 | 20 | 20 | 20 | 20 | 20 | 20 |
| | Graphite | −0.5 mm | 20 | 20 | 20 | 20 | 20 | 20 | 20 | 20 | 20 |
| | Boron oxide (*) | −0.1 mm | 1.6 | 1.6 | 1.6 | 1.6 | 1.6 | 1.6 | 1.6 | 1.6 | 1.6 |
| | Silicon oxide (*) | −0.1 mm | | | 11.6 | | | | | | |
| | SiC | −0.1 mm | 0.5 | 11.6 | | 26 | 29.4 | | | 26.7 | 27.8 |
| | $Si_3N_4$ | −0.1 mm | | | | | | 26 | | | |
| | $ZrO_2$ | −0.1 mm | | | | | | | | | 7.2 |
| | Metal Si | −0.1 mm | | | | | | | 2.1 | 2.7 | |
| Binder | Phenolic resin (*) | content of solid resin (fixed carbon 50%) | +5 | +5 | +5 | +5 | +5 | +5 | +5 | +5 | +5 |

TABLE 7-continued

|  |  | Inventive sample 39 | Inventive sample 40 | Comparative sample 11 | Inventive sample 41 | Inventive sample 42 | Inventive sample 43 | Inventive sample 44 | Inventive sample 45 | Inventive sample 46 |
|---|---|---|---|---|---|---|---|---|---|---|
| Chemical composition | Content of carbon (mass %) | 21.5 | 19.4 | 19.4 | 17.3 | 16.9 | 17.3 | 21.2 | 16.9 | 16.2 |
|  | Total content of one or more of the oxides (*) (mass %) | 1.5 | 1.4 | 11.4 | 1.2 | 1.2 | 1.2 | 1.5 | 1.2 | 1.2 |
|  | Total content of (CaO + MgO) (mass %) | 76 | 69 | 77 | 61 | 60 | 61 | 75 | 60 | 57.5 |
|  | SiC (mass %) | 0.5 | 10.0 |  | 20.0 | 22.0 | 0.0 | 0.0 | 20.0 | 20.0 |
|  | $SiO_2$ (mass %) |  |  | 10.0 |  |  |  |  |  |  |
|  | $Si_3N_4$ (mass %) | 0.0 | 0.0 | 0.0 | 0.0 | 0.0 | 20.0 | 0.0 | 0.0 | 0.0 |
|  | $ZrO_2$ (mass %) | 0.0 | 0.0 | 0.0 | 0.0 | 0.0 | 0.0 | 0.0 | 0.0 | 5.0 |
|  | Metal Si (mass %) | 0.0 | 0.0 | 0.0 | 0.0 | 0.0 | 0.0 | 2.0 | 2.0 | 0.0 |
|  | Mass ratio CaO/MgO | 0.8 | 0.8 | 0.8 | 0.8 | 0.8 | 0.8 | 0.8 | 0.8 | 0.8 |
|  | Carbonation treatment — Implementation of carbonation treatment | Yes | Yes | Yes | Yes | Yes | Yes | Yes | Yes | Yes |
|  | $CaCO_3$ content (mass %) | 1.0 | 1.0 | 1.0 | 1.0 | 1.0 | 1.0 | 1.0 | 1.0 | 1.0 |
| State of microstructure | State of compound of CaO with one or more of the oxides (*) in each surface of burnt dolomite clinker particles (after burning in non-oxidizing atmosphere at 1200° C.) | capsular film | capsular film | capsular film, many cracks | capsular film | capsular film | capsular film | capsular film | capsular film | capsular film |
|  | Thickness range (μm) | 2~5 | 2~5 | 30~40 | 2~5 | 2~5 | 2~5 | 2~5 | 2~5 | 2~5 |
| Evaluation result | (1) In-molten steel rotation test [S] 100-200 ppm — Criteria; Excellent (double circle): <±5, Good (○): <±20 | 25 | −5 | −40 | −30 | −35 | −15 | −15 | −28 | −3 |
|  | Adhesion (+)/wear (−) speed (μm/min) — Acceptable (Δ): ±21 to ±35, Unacceptable (×): >±36 | Δ | ⊚ | × | Δ | Δ | ○ | ○ | Δ | ⊚ |
|  | (2) Slaking resistance 40° C., 90 RH % (in air) — Criteria; Excellent (double circle): >31 days, Good (○): 15 to 30 days | >100 | >100 | 15 | >100 | >100 | >100 | >100 | >100 | >100 |
|  | The number of days until weight change index reaches 101.5 — Acceptable (Δ): 3 to 14 days, Unacceptable (×): <2 days | ⊚ | ⊚ | ○ | ⊚ | ⊚ | ⊚ | ⊚ | ⊚ | ⊚ |
| ○: Excellent, Δ: Good, ×: Bad |  | Δ | ○ | × | ○ | ○ | ○ | ○ | ○ | ○ |

Each of the inventive samples 39 to 41 is an example of a refractory product containing $SiO_2$ in an amount of 0.5 to 20 mass %. In the in-molten steel rotation test, due to an influence of a sulfur concentration in molten steel, even in the inventive sample 39 containing $SiO_2$ in an amount of 0.5 mass %, a tendency of alumina adhesion is observed although it is in a practicable range for casting operation. In the inventive sample 40 containing $SiO_2$ in an amount of 10 mass %, alumina adhesion is cleared, and a slight tendency of wear is observed. In the inventive sample 41 containing $SiO_2$ in an amount of 20 mass %, a significant tendency of wear is observed. In the inventive sample 42 containing $SiO_2$ in an amount of 22 mass %, a tendency toward a further increase in wear is observed. This shows that, even when the sulfur concentration in molten steel is as high as 100 to 200 ppm, the incorporation of SiC makes it possible to obtain an effect of significantly suppressing alumina adhesion onto a surface of the refractory product. This result shows that SiC is preferably contained in an amount of 20 mass % or less.

The inventive sample 43, the inventive sample 44, the inventive sample 45 and inventive sample 46 are, respectively, an example of a refractory product containing $Si_3N_4$ in place of SiC, an example of a refractory product containing metal Si in place of SiC, an example of a refractory product containing metal Si in addition to SiC, and an example of a refractory product containing $ZrO_2$ in addition to SiC. In either of SiC, $Si_3N_4$ and metal Si, an effect of significantly suppressing alumina adhesion onto a surface of the refractory product can be obtained although the effect is lower than that of SiC, as seen in Table 7.

From the above results, it is proven that SiC, $Si_3N_4$ or metal Si exhibits a similar function. It is also proven that even if these components coexist together, they never induce a peculiar reaction with each other, and therefore $Si_3N_4$ or metal Si can be used in combination with an SiC component. In such a combination, an upper limit as a total content of the combination becomes higher than an upper limit in a refractory product using only an SiC component. However, an excessive content of these components is likely to cause deterioration in stability of the refractory product as a structural body. Thus, a total of respective upper limits thereof is preferably set to 22 mass % or less.

The inventive sample 46 is an example of a refractory product obtained by incorporating a $ZrO_2$ component into a refractory product containing SiC in an upper limit of 20 mass %. Specifically, it is an example of a refractory product obtained by incorporating a $ZrO_2$ component in an amount of 5 mass %, into the inventive sample 41 containing SiC in an upper limit of 20 mass %. In the inventive sample 41, the index of the wear amount in the in-molten steel rotation test is 30, whereas, in the inventive sample 46, the wear is drastically reduced to an index value of 3. This shows that the presence of a $ZrO_2$ component allows a microstructure around a surface of the refractory product having a melting point lowered in association with inclusions in molten steel to be increased in viscosity so as to effectively improve stability of the microstructure.

The comparative sample 11 is an example of a refractory product obtained by 10 mass % of SiC is replaced by 10 mass % of $SiO_2$. Table 7 shows that a film generated in each CaO surface becomes thicker, causing deterioration in slaking resistance, and the wear amount in the in-molten steel rotation test is increased, supposedly due to lowering of melting point.

Then, a nozzle was prepared by using the inventive sample 40 as a nozzle body refractory member (22) (outer tube) on the side of a molten steel immersion surface, and using the inventive sample 17 as an inner bore-side refractory member (20), in the casting nozzle structure illustrated in FIG. 3A. The nozzle body refractory member (22) and the powder line portion (21) were integrally molded by a CIP process, using a refractory material comprising 60 mass % of $Al_2O_3$, 15 mass % of $SiO_2$ and 25 mass % of carbon, and a refractory material comprising 82 mass % of $ZrO_2$, 4 mass % of CaO and 14 mass % of carbon, respectively, and a resulting shaped body was subjected to drying, burning and machining to prepare an immersion nozzle. In this process, two types of materials were used as the layer (23) between the inner bore-side refractory layer and the nozzle body refractory layer. In one type of immersion nozzle, a carbonaceous sheet comprising 98 mass % of carbon and having a thickness of 0.5 mm was arranged as a material for the layer (23) in advance of the molding, and integrally molded with the nozzle body refractory layer. Another type of immersion nozzle was prepared by: forming a sleeve-shaped inner bore-side refractory layer (20) using the refractory product of the inventive sample 17; subjecting the inner bore-side refractory layer (20) to a heat treatment; and integrally installing the inner bore-side refractory layer (20) to the nozzle body refractory layer (22) prepared separately and concurrently. Mortar used in this process was a material (23) comprising 76 mass % of MgO, 16 mass % of $Al_2O_3$ and 8 mass % of carbon. The mortar was set to fill a 2 mm space defined between the sleeve-shaped inner bore-side refractory layer (20) and the nozzle body refractory layer (22, 21), and subjected to a heat treatment to integrate the layers together.

Each of the two types of immersion nozzles was subjected to an actual continuous casting operation for molten steel (aluminum killed steel), and used for 10 thermal cycles. As a result, both of the immersion nozzles were free of the occurrence of damage or the like due to slaking. Both of the immersion nozzles were also free of the occurrence of breakage during preheating and casting (primarily due to thermal shock). Further, after completion of the casting, an (average) aluminum adhesion/wear speed in an inner bore portion and a discharge port portion in each of the immersion nozzles was checked and evaluated. In this evaluation, the aluminum adhesion/wear speed was −4 µm/min (minus indicates wear), i.e., an excellent result without any alumina adhesion could be obtained. Consequently, a result could be obtained in which a flow of molten steel within a casting mold during casting became significantly more stable.

On the other hand, in a conventional immersion nozzle devoid of the refractory product of the present invention (a nozzle body refractory member (22) and a powder line portion (21) were made, respectively, of a refractory material comprising 60 mass % of $Al_2O_3$, 15 mass % of $SiO_2$ and 25 mass % of carbon, and a refractory material comprising 82 mass % of $ZrO_2$, 4 mass % of CaO and 14 mass % of carbon), the (average) aluminum adhesion/wear speed was +55 µm/min, i.e., alumina adhesion occurred in an inner bore portion and a discharge port portion thereof, and a biased flow was observed in a casting mold during casting.

EXPLANATION OF CODES

1: coating layer (hydrated layer)
2: carbonaceous matrix before heat treatment
3: burnt dolomite clinker particle
4: carbonaceous matrix after heat treatment
5: void layer produced after heat treatment
6: $B_2O_3$-based film produced after heat treatment
10: test piece
10a: edge
11: holder
12: crucible
13: molten steel
14: high-frequency induction furnace
20: refractory material of the present invention
21: power line material (second refractory layer)
22: nozzle body material (second refractory layer)
22G: nozzle body material (gas-permeable refractory member)
22S: space (gas passage, gas accumulator)
23: sheet-shaped layer or mortar layer
A: upper nozzle
B: sliding nozzle plate
C: lower nozzle
D: long nozzle
E: long stopper
F: immersion nozzle
G: refractory liner material

What is claimed is:

1. A refractory product, comprising;
a CaO component-containing refractory particles; and
an MgO component-containing refractory particles;
the refractory product containing, in terms of a chemical composition measured after it has undergone heating in a non-oxidizing atmosphere at 1000° C.,
one or more metal oxides selected from the group consisting of $B_2O_3$, $TiO_2$, $V_2O_5$, $P_2O_5$ and $SiO_2$ in a total amount of 0.1 to 5.0 mass %, and
free carbon in an amount of 2 to 35 mass %,
with the remainder including CaO and MgO whose mass ratio (CaO/MgO) is in the range of 0.1 to 1.5; and
wherein, in microscopic observation performed at room temperature on a sample of the refractory product which has undergone heating in a non-oxidizing atmosphere at 1000° C., an inorganic film comprised of CaO and the one or more metal oxides selected from the group consisting of $B_2O_3$, $TiO_2$, $V_2O_5$, $P_2O_5$ and $SiO_2$ is formed in at least each CaO surface of the CaO component-containing refractory particles, with a thickness of 0.1 to 25 µm.

2. The refractory product as defined in claim 1, which contains calcium carbonate ($CaCO_3$) in an amount of 0.1 to less than 2.5 mass %, in a state in which the refractory product has not undergone a heat treatment at a temperature equal to or greater than a decomposition temperature of $CaCO_3$.

3. The refractory product as defined in claim 1, wherein, in a microscopic observation field of view during the microscopic observation performed at room temperature on a sample of the refractory product which has undergone heating in a non-oxidizing atmosphere at 1000° C., a total thickness of void spaces located on opposite sides of a maximum-size one of a plurality of refractory particles each containing either one or both of a CaO component and an MgO component and in an interface between the maximum-size refractory particle and a carbonaceous matrix is in a range of 0.1 to 3.0% of a particle size of the maximum-size refractory particle.

4. The refractory product as defined in claim 1 which further contains one or more selected from the group consisting of SiC, $Si_3N_4$, $ZrO_2$ and metal Si, wherein, on an assumption that respective contents of SiC, $Si_3N_4$, $ZrO_2$ and metal Si are determined in terms of a chemical composition as measured after the refractory product has undergone heating in a non-oxidizing atmosphere at 1000° C.:

in the case of selecting SiC and/or $Si_3N_4$, either one or both of them are contained in an amount of 0.5 to 20 mass % or less, individually or in total;

in the case of selecting $ZrO_2$, it is contained in an amount of 0.5 to 5 mass %; and in the case of selecting metal Si, it is contained in an amount of 0.3 to 2 mass %.

5. A casting nozzle comprising the refractory product as defined in claim 1, the refractory product being arranged in a part or an entirety of a region to be subjected to a contact with molten steel, in the form of a single layer with a thickness ranging from a contact surface with molten steel to a back surface opposed thereto.

6. A casting nozzle formed in a multi-layer structure comprising:
a first refractory layer arranged to define a part or an entirety of a surface to be subjected to a contact with molten steel, the first refractory layer being composed of the refractory product as defined in claim 1; and
a second refractory layer arranged on the side of a back surface of the first refractory layer, the second refractory layer having a composition different from that of the first refractory layer,
wherein the first and second refractory layers are integrated together in direct contact relation to each other.

7. A casting nozzle formed in a multi-layer structure comprising:
a first refractory layer arranged to define a part or an entirety of a surface to be subjected to a contact with molten steel, the first refractory layer being composed of the refractory product as defined in claim 1;
a second refractory layer arranged on the side of a back surface of the first refractory layer, the second refractory layer having a composition different from that of the first refractory layer; and
a sheet-shaped third layer arranged between the first refractory layer and the second refractory layer, the third layer containing carbon in an amount of 90 mass % or more and having a thickness of 0.1 to 3 mm,
wherein the first refractory layer and the second refractory layer are formed in an integral structure in non-contact relation to each other.

8. A casting nozzle formed in a multi-layer structure comprising:
a first refractory layer arranged to define a part or an entirety of a surface to be subjected to a contact with molten steel, the first refractory layer being composed of the refractory product as defined in claim 1; and
a second refractory layer arranged on the side of a back surface of the first refractory layer, the second refractory layer having a composition different from that of the first refractory layer,
wherein the first refractory layer and the second refractory layer are bonded together by mortar having a composition free of flow-down due to melting at a molten steel temperature, whereby the first refractory layer and the second refractory layer are retained in non-contact relation to each other.

9. The casting nozzle as defined in claim 5, which comprises a layer composed of a gas-injecting refractory member and provided in a part of an inner bore portion.

10. A refractory product, comprising:
a composition formed after being heated to at least 1000° C., including,
a CaO component-containing refractory particles; and
an MgO component-containing refractory particles;
the refractory product containing, in terms of a chemical composition measured after it has undergone heating in a non-oxidizing atmosphere at 1000° C.,
one or more metal oxides selected from the group consisting of $B_2O_3$, $TiO_2$, $V_2O_5$, $P_2O_5$ and $SiO_2$ in a total amount of 0.1 to 5.0 mass %, and
free carbon in an amount of 2 to 35 mass %,
with the remainder including CaO and MgO whose mass ratio (CaO/MgO) is in the range of 0.1 to 1.5; and
wherein, in microscopic observation performed at room temperature on a sample of the refractory product which has undergone heating in a non-oxidizing atmosphere at 1000° C., an inorganic film comprised of CaO and the one or more metal oxides selected from the group consisting of $B_2O_3$, $TiO_2$, $V_2O_5$, $P_2O_5$ and Sift is formed in at least each CaO surface of the CaO component-containing refractory particles, with a thickness of 0.1 to 25 μm.

11. The refractory product of claim 10, wherein the heating to at least 1000° C. is performed in a non-oxidizing atmosphere.

* * * * *